United States Patent
Nozaki et al.

(10) Patent No.: US 8,140,207 B2
(45) Date of Patent: Mar. 20, 2012

(54) VEHICLE AND CONTROL METHOD THEREOF

(75) Inventors: Takeshi Nozaki, Toyota (JP); Shinobu Nishiyama, Toyoake (JP)

(73) Assignees: Toyota Jidosha Kabushiki Kaisha, Toyota (JP); Aisin AW Co., Ltd., Anjo-shi (JP)

( * ) Notice: Subject to any disclaimer, the term of this patent is extended or adjusted under 35 U.S.C. 154(b) by 537 days.

(21) Appl. No.: 12/311,731

(22) PCT Filed: Aug. 24, 2007

(86) PCT No.: PCT/JP2007/066408
§ 371 (c)(1),
(2), (4) Date: Apr. 13, 2009

(87) PCT Pub. No.: WO2008/044392
PCT Pub. Date: Apr. 17, 2008

(65) Prior Publication Data
US 2010/0004833 A1    Jan. 7, 2010

(30) Foreign Application Priority Data
Oct. 11, 2006    (JP) .................................. 2006-278036

(51) Int. Cl.
*G05D 3/00* (2006.01)
(52) U.S. Cl. ..................... 701/22; 701/58; 180/65.21
(58) Field of Classification Search ............ 701/22, 701/58; 180/65.21
See application file for complete search history.

(56) References Cited

U.S. PATENT DOCUMENTS

| 7,463,962 | B2 * | 12/2008 | Brunemann et al. | 701/55 |
| 2009/0058326 | A1 * | 3/2009 | Oyobe et al. | 318/53 |
| 2009/0088913 | A1 * | 4/2009 | Oyama et al. | 701/22 |
| 2009/0101428 | A1 * | 4/2009 | Itoh | 180/197 |

FOREIGN PATENT DOCUMENTS

| JP | A-8-251708 | 9/1996 |
| JP | A-2000-88088 | 3/2000 |
| JP | A-2000-220512 | 8/2000 |
| JP | A-2000-324607 | 11/2000 |
| JP | A-2006-81248 | 3/2006 |
| JP | A-2006-220225 | 8/2006 |
| RU | 2 101 749 C1 | 1/1998 |

* cited by examiner

Primary Examiner — Thomas Black
Assistant Examiner — Shardul Patel
(74) Attorney, Agent, or Firm — Oliff & Berridge, PLC

(57) ABSTRACT

When the detected value of a rotation speed sensor is normal, it is determined whether or not a vehicle is stopping by using a predetermined rotation speed N1 as a stop determination upper limit rotation speed Nojmax, and when the detected value of the rotation speed sensor is not a normal value due to a magnetic field or the like from a road heater, it is determined whether or not the vehicle is stopping by using a predetermined rotation speed N2 which is larger than the predetermined rotation speed N1 as the stop determination upper limit rotation speed Nojmax. Thereby, it can be more properly determined whether or not the vehicle is stopping in accordance with whether or not the detected value of the rotation speed sensor is normal.

18 Claims, 8 Drawing Sheets

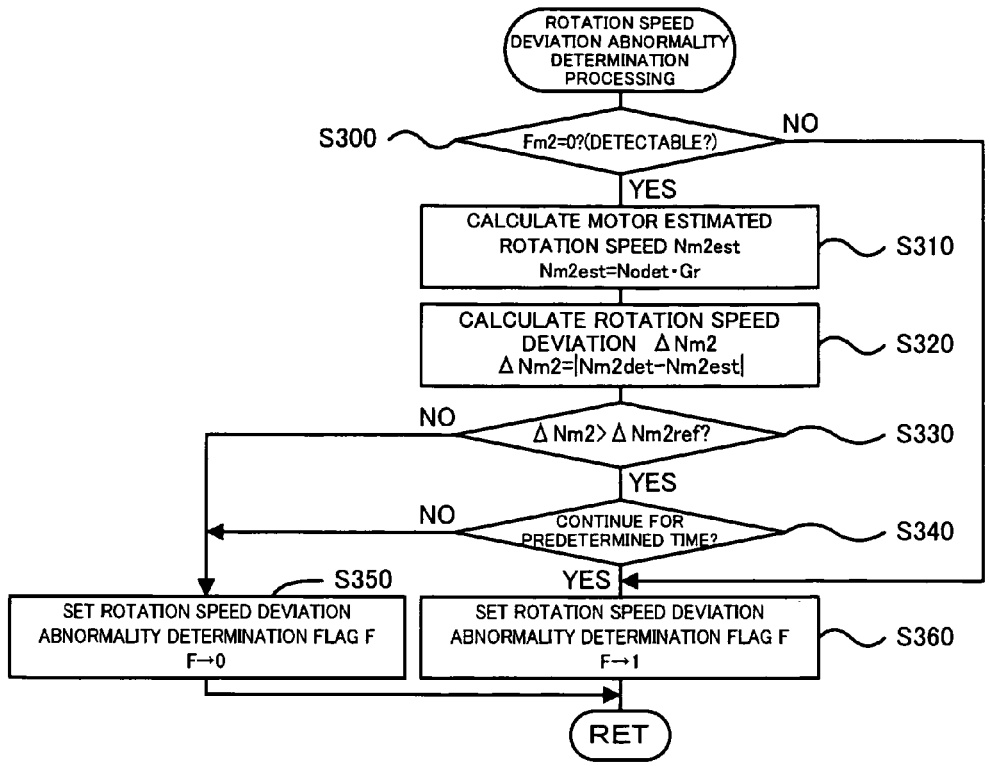
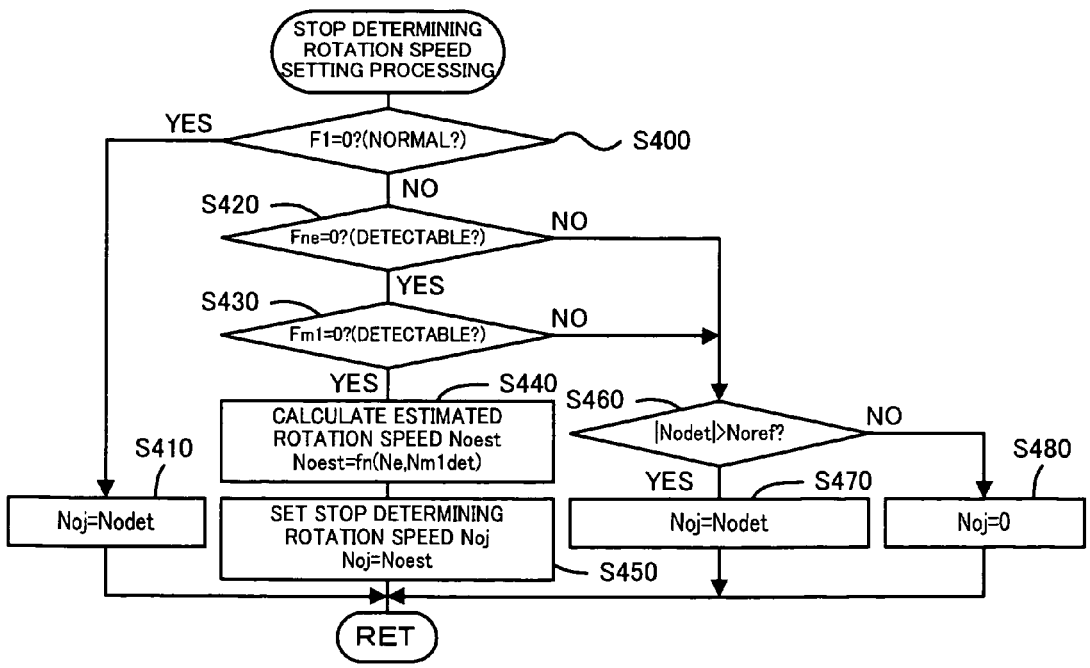

VEHICLE AND CONTROL METHOD THEREOF

TECHNICAL FIELD

The present invention relates to a vehicle and a control method thereof.

BACKGROUND ART

Conventionally, as the vehicle of this kind, there is proposed the one including an engine, a transmission, a clutch connecting the engine and the transmission, and an electromagnetic pickup detecting the rotational speed of an input shaft of the transmission (see, for example, Patent Document 1). In a cold district, snow-melting road surface heaters are sometimes buried in roads, and an electromagnetic pickup is susceptible to the influence of an AC magnetic field by an alternating current which is passed to the road surface heater. Therefore, in this vehicle, it is determined whether or not the electromagnetic pickup is influenced by an AC magnetic field by checking the value of the input rotation speed which is detected by the electromagnetic pickup when the ignition is turned off and the engine is stopping, and when the electromagnetic pickup is influenced by the AC magnetic field, the clutch is controlled by using a rotational speed at which the electromagnetic pickup is not influenced by the AC magnetic field, whereby the vehicle can be properly controlled even under the environment in which the electromagnetic pickup is influenced by an AC magnetic field.

[Patent Document 1] Japanese Patent Laid-Open No. 2000-88088

DISCLOSURE OF THE INVENTION

Incidentally, in the vehicle which includes a motor which is connected to a drive shaft connected to drive wheels via a power transmission member such as a transmission, and a rotation speed sensor detecting the rotation speed of the drive shaft (sensor susceptible to the influence of a magnetic field from a road surface heater), and determines whether or not the vehicle is stopping on the basis of whether or not the rotation speed of the drive shaft detected by the rotation speed sensor is a predetermined rotation speed or less, it is desired to more properly determine whether or not the vehicle is stopping in accordance with whether the rotation speed sensor is influenced by the road surface heater. Further, in the vehicle in which some processing is performed in response to the operation of turning off the ignition by a driver under the condition that the vehicle is determined as stopping, it is necessary to make it possible to determine whether or not the rotation speed sensor is influenced by a road surface heater even when the ignition is turned on, and to make it possible to determine whether or not the vehicle is stopping.

A vehicle and a control method of the same of the present invention have an object to make it possible to more properly determine whether or not the vehicle is stopping in accordance with whether a detected drive shaft rotation speed which is detected by a drive shaft rotation speed detector which detects a rotation speed of a drive shaft connected to drive wheels, and a detected motor rotation speed which is detected by a motor rotation speed detector which detects a rotation speed of a motor are both normal. Further, the vehicle and the control method of the same of the present invention has an object to make it possible to determine whether or not the detected drive shaft rotation speed and the detected motor rotation speed are both normal.

In order to achieve at least a part of the above object, the vehicle and the control method thereof in accordance with the present invention adopt the following means.

The present invention is directed to a vehicle. The vehicle includes: a motor capable of inputting and outputting power; a power transmission module transmitting power between the motor and a drive shaft connected to a drive wheel; a drive shaft rotation speed detection or estimation module detecting or estimating a rotation speed of the drive shaft; a motor rotation speed detection module detecting a rotation speed of the motor; a rotation speed determination module determining whether or not a detected or estimated drive shaft rotation speed and a detected motor rotation speed are both normal on the basis of the detected or estimated drive shaft rotation speed which is the rotation speed of the drive shaft detected or estimated by the drive shaft rotation speed detection or estimation module, and the detected motor rotation speed which is the rotation speed of the motor detected by the motor rotation speed detection module; a stop determination range setting module setting a first predetermined rotation speed range as a stop determination range when the detected or estimated drive shaft rotation speed and the detected motor rotation speed are both determined as normal by the rotation speed determination module, and setting a second predetermined rotation speed range with the first predetermined rotation speed range as one part thereof as the stop determination range when it is determined that at least one of the detected or estimated drive shaft rotation speed and the detected motor rotation speed is not normal by the rotation speed determination module; and a vehicle stop determination module determining whether or not the vehicle is stopping on the basis of a determining rotation speed of the drive shaft which is set on the basis of the detected or estimated drive shaft rotation speed detected or estimated by the drive shaft rotation speed detection or estimation module, or the detected motor rotation speed detected by the motor rotation speed detection module, and a stop determination range set by the stop determination range setting module.

In the vehicle of the present invention, it is determined whether or not a detected or estimated drive shaft rotation speed and a detected motor rotation speed are both normal on the basis of the detected or estimated drive shaft rotation speed which is the rotation speed of the drive shaft detected or estimated by a drive shaft rotation speed detection or estimation module, and the detected motor rotation speed which is the rotation speed of the motor detected by the motor rotation speed detection module, a first predetermined rotation speed range is set as the stop determination range when the detected or estimated drive shaft rotation speed and the detected motor rotation speed are both determined as normal, a second predetermined rotation speed range with the first predetermined rotation speed range as one part thereof is set as the stop determination range when it is determined that at least one of the detected or estimated drive shaft rotation speed and the detected motor rotation speed is not normal, and it is determined whether or not the vehicle is stopping on the basis of a determining rotation speed of the drive shaft which is set on the basis of the detected or estimated drive shaft rotation speed or the detected motor rotation speed, and the stop determination range. More specifically, it is determined whether or not the detected drive shaft rotation speed and the detected motor rotation speed are both normal on the basis of the detected or estimated drive shaft rotation speed and the detected motor rotation speed. When it is determined that the detected or estimated drive shaft rotation speed and the detected motor rotation speed are both normal, it is determined whether or not the vehicle is stopping on the basis of the determining rotation speed of the drive shaft and the first predetermined rotation speed range. When it is determined that at least one of the detected or estimated drive shaft rotation speed and the detected motor rotation speed is not normal, it is determined whether or not the vehicle is stopping on the basis of the determining rotation speed of the drive shaft, and the second predetermined rotation speed range with the first predetermined rotation speed range as one part thereof. Thereby, it can be more properly determined whether or not the vehicle is stopping, as compared with the one that determines whether or not the vehicle is stopping by using the first predetermined rotation speed range irrespective of whether or not the detected or estimated drive shaft rotation speed and the detected motor rotation speed are both normal. Further, it can be determined whether or not the detected or estimated drive shaft rotation speed and the detected motor rotation speed are both normal on the basis of the detected or estimated drive shaft rotation speed and the detected motor rotation speed. Here, the drive shaft rotation speed detection or estimation module includes the drive shaft rotation speed detection module which detects the rotation speed of the drive shaft, and the drive shaft rotation speed estimation module which estimates the rotation speed of the drive shaft.

In the vehicle of the present invention, the stop determination range setting module may be a module which sets a range of the first predetermined rotation speed or less as the first predetermined rotation speed range, and sets a range of the second predetermined rotation speed or less, which is larger than the first predetermined rotation speed as the second predetermined rotation speed range; and the vehicle stop determination module may be a module which determines whether or not the vehicle is stopping on the basis of an absolute value of the determining rotation speed of the drive shaft and the stop determination range.

Also, in the vehicle of the present invention, the drive shaft rotation speed detection or estimation module may be a module detecting or estimating a rotation speed based on the rotation speed of the drive shaft and a predetermined factor when the predetermined factor occurs; the motor rotation speed detection module may be a module capable of detecting the rotation speed of the motor irrespective of the predetermined factor even when the predetermined factor occurs; and the stop determination range setting module may be a module setting a range including the detected or estimated drive shaft rotation speed when the predetermined factor occurs as the second predetermined rotation speed range. In this manner, it can be more properly determined that the vehicle is stopping when a predetermined factor occurs. Further, in this case, the detected or estimated drive shaft rotation speed is based on the rotation speed of the drive shaft and the predetermined factor, and the detected motor rotation speed becomes the rotation speed of the motor irrespective of the predetermined factor. Therefore, in the rotation speed determination module, it is determined whether or not the detected drive shaft rotation speed and the detected motor rotation speed are both normal on the basis of the detected drive shaft rotation speed with addition of the influence of the predetermined factor, and the detected motor rotation speed without addition of the influence of the predetermined factor. Here, the aforementioned drive shaft rotation speed detection module may be the module which detects the rotation speed of the aforementioned drive shaft by the electromagnetic pickup. Further, the time when the predetermined factor occurs includes the time when the vehicle is influenced by the magnetic field based on the current which is passed to the road heater while the vehicle is in the stopping state.

Further, in the vehicle of the present invention, the stop determination range setting module may be a module which sets the second predetermined rotation speed range as the stop determination range when the detected motor rotation speed is within a third predetermined rotation speed range, and sets the first predetermined rotation speed range as the stop determination range when the detected motor rotation speed is outside the third predetermined rotation speed range, when it is determined that at least one of the detected or estimated drive shaft rotation speed and the detected motor rotation speed is not normal by the rotation speed determination module; and the vehicle stop determination module may be a module which determines whether or not the vehicle is stopping with the detected or estimated drive shaft rotation speed as the determining rotation speed of the drive shaft. In this case, the stop determination range setting module may set a range of the rotation speed of the motor corresponding to the first predetermined rotation speed range in the rotation speed of the drive shaft as the third predetermined rotation speed range.

In addition, in the vehicle of the present invention, the rotation speed determination module may be a module which estimates the rotation speed of the motor on the basis of the detected or estimated drive shaft rotation speed and a state of the power transmission module, and determines whether or not the detected or estimated drive shaft rotation speed and the detected motor rotation speed are both normal on the basis of a deviation between an estimated motor rotation speed which is the estimated rotation speed of the motor and the detected motor rotation speed. In this case, the rotation speed determination module may be a module which determines that at least one of the detected or estimated drive shaft rotation speed and the detected motor rotation speed is not normal when the deviation between the estimated motor rotation speed and the detected motor rotation speed is outside a fourth predetermined rotation speed range for a predetermined time. In this manner, it can be more properly determined whether or not the detected drive shaft rotation speed and the detected motor rotation speed are both normal.

Also, in the vehicle of the present invention, the vehicle stop determination module may be a module which determines whether or not the vehicle is stopping with value 0 set as the determining rotation speed of the drive shaft when the detected or estimated drive shaft rotation speed is within a fifth predetermined rotation speed range, and determines whether or not the vehicle is stopping with the detected or estimated drive shaft rotation speed set as the determining rotation speed of the drive shaft when the detected or estimated drive shaft rotation speed is outside the fifth predetermined rotation speed range, when it is determined at least one of the detected or estimated drive shaft rotation speed and the detected motor rotation speed is not normal by the rotation speed determination module. In this case, the vehicle stop determination module may be a module which sets a range including the detected or estimated drive shaft rotation speed when the vehicle is stopping as the fifth predetermined rotation speed range. In this manner, it can be more properly determined that the vehicle is stopping when the vehicle is stopping.

In addition, the vehicle of the present invention may further include: an internal combustion engine; and a rotation regulation module which is connected to an output shaft of the internal combustion engine and the drive shaft independently rotatable with respect to the output shaft, and is capable of regulating a rotation speed of the output shaft with respect to the drive shaft with input and output of electric power and input and output of power to and from the output shaft and the drive shaft. In this case, the rotation regulation module may be a module including a three shaft-type power input output module which is connected to three shafts that are the output shaft of the internal combustion engine, the drive shaft and a third shaft, and inputs and outputs power to and from a remaining shaft on the basis of power which is input and output to and from any two shafts of the three shafts, and a generator capable of inputting and outputting power to and from the third shaft.

In the vehicle of the present invention which includes the internal combustion engine, the three shaft-type power input output module and the generator, the drive shaft rotation speed detection or estimation module may be a module including a drive shaft rotation speed detection module which detects a rotation speed of the drive shaft, an engine rotation speed detection module which detects a rotation speed of the internal combustion engine, a generator rotation speed detection module which detects a rotation speed of the generator, and a drive shaft rotation speed estimation module which estimates the rotation speed of the drive shaft on the basis of a detected engine rotation speed which is the rotation speed of the internal combustion engine detected by the engine rotation speed detection module and a detected generator rotation speed which is the rotation speed of the generator detected by the generator rotation speed detection module; and the vehicle stop determination module may be a module which sets the detected drive shaft rotation speed which is the rotation speed of the drive shaft detected by the drive shaft rotation speed detection module, or the estimated drive shaft rotation speed which is the rotation speed of the drive shaft estimated by the drive shaft rotation speed estimation module as the detected or estimated drive shaft rotation speed, and determines whether or not the vehicle is stopping on the basis of the determining rotation speed of the drive shaft which is set on the basis of the detected or estimated drive shaft rotation speed or the detected motor rotation speed and the stop determination range, when it is determined that at least one of the detected or estimated drive shaft rotation speed and the detected motor rotation speed is not normal by the rotation speed determination module. In this manner, it can be determined whether the vehicle is stopping or not by using the detected or estimated drive shaft rotation speed (the detected drive shaft rotation speed or the estimated drive shaft rotation speed) or the detected motor rotation speed. In this case, the vehicle stop determination module may be a module which determines whether or not the vehicle is stopping with value 0 set as the determining rotation speed of the drive shaft when the detected or estimated drive shaft rotation speed is within the fifth predetermined rotation speed range, and determines whether or not the vehicle is stopping with the detected or estimated drive shaft rotation speed set as the determining rotation speed of the drive shaft when the detected or estimated drive shaft rotation speed is outside the fifth predetermined rotation speed range, when it is determined that at least one of the detected or estimated drive shaft rotation speed and the detected motor rotation speed is not normal by the rotation speed determination module, and when the rotation speed of the internal combustion engine cannot be detected by the engine rotation speed detection module, or when the rotation speed of the generator cannot be detected by the generator rotation speed detection module. In this case, the vehicle stop determination module may be a module which sets a range including the detected or estimated drive shaft rotation speed when the vehicle is stopping as the fifth predetermined rotation speed range. In this manner, it can be more properly determined that the vehicle is stopping when the vehicle is stopping.

The vehicle of the present invention may further include: a lock module which locks the drive wheel; and a parking control module which controls the lock module so that the drive wheel is locked by said lock module when parking conditions including a condition that the vehicle is determined as stopping by the vehicle stop determination module, and a condition that a shift position is operated to shift to a parking position by a driver are established.

Also, the vehicle of the present invention may further include: an accumulator capable of charging and discharging electricity; a cutoff and connection module which connects the accumulator to an electric drive system including at least the motor to be capable of cut off the accumulator; and a cutoff control module which controls the cutoff and connection module so that the motor and the accumulator are cut off by the cutoff and connection module when cutoff conditions including a condition that the vehicle is determined as stopping by the vehicle stop determination module, and a condition that ignition is turned off by a driver are established. In this case, in the vehicle including the internal combustion engine in addition to the motor, and the rotation regulation module which is connected to the output shaft of the internal combustion engine and the drive shaft independently rotatable with respect to the output shaft, and is capable of regulating the rotation speed of the output shaft with respect to the aforementioned shaft with input and output of electric power, and input and output of power to and from the output shaft and the drive shaft, the cutoff and connection module may be a module which connects the accumulator to the electric drive system including the motor and the rotation regulation module to be capable of disconnecting the accumulator.

In the vehicle of the present invention, the power transmission module may be a transmission module which transmits power between the rotating shaft of the motor and the drive shaft with change in a transmission ratio.

The present invention is directed to a control method of a vehicle including a motor capable of inputting and outputting power, a power transmission module transmitting power between the motor and a drive shaft connected to a drive wheel, a drive shaft rotation speed detection or estimation module detecting or estimating a rotation speed of the drive shaft, and a motor rotation speed detection module detecting a rotation speed of the motor. In the control method of the vehicle, it is determined whether or not a detected or estimated drive shaft rotation speed and a detected motor rotation speed are both normal on the basis of the detected or estimated drive shaft rotation speed which is the rotation speed of the drive shaft detected or estimated by the drive shaft rotation speed detection or estimation module, and the detected motor rotation speed which is the rotation speed of the motor detected by the motor rotation speed detection module; and when it is determined that the detected or estimated drive shaft rotation speed and the detected motor rotation speed are both normal, it is determined whether or not the vehicle is stopping on the basis of a determining rotation speed of the drive shaft which is set on the basis of the detected or estimated drive shaft rotation speed or the detected motor rotation speed, and a first predetermined rotation speed range, and when it is determined that at least one of the detected or estimated drive shaft rotation speed and the detected motor rotation speed is not normal, it is determined whether or not the vehicle is stopping on the basis of the determining rotation speed of the drive shaft which is set on the basis of the detected or estimated drive shaft rotation speed or the detected motor rotation speed and a second predetermined rotation speed range with the first predetermined rotation speed range as a part thereof.

In the control method of the vehicle of the present invention, it is determined whether or not the detected or estimated drive shaft rotation speed and the detected motor rotation speed are both normal on the basis of the detected or estimated drive shaft rotation speed which is the rotation speed of the drive shaft detected or estimated by the drive shaft rotation speed detection or estimation module, and the detected motor rotation speed which is the rotation speed of the motor detected by the motor rotation speed detection module, and when it is determined that the detected or estimated drive shaft rotation speed and the detected motor rotation speed are both normal, it is determined whether or not the vehicle is stopping on the basis of the determining rotation speed of the drive shaft which is set on the basis of the detected or estimated drive shaft rotation speed or the detected motor rotation speed, and the first predetermined rotation speed range, and when it is determined that at least one of the detected or estimated drive shaft rotation speed and the detected motor rotation speed is not normal, it is determined whether or not the vehicle is stopping on the basis of the determining rotation speed of the drive shaft which is set on the basis of the detected or estimated drive shaft rotation speed or the detected motor rotation speed and the second predetermined rotation speed range with the first predetermined rotation range as one part thereof. Thereby, it can be more properly determined whether or not the vehicle is stopping as compared with the one that determines whether or not the vehicle is stopping by using the first predetermined rotation speed range irrespective of whether or not the detected or estimated drive shaft rotation speed and the detected motor rotation speed are both normal. Further, it can be detected whether or not the detected or estimated drive shaft rotation speed and the detected motor rotation speed are both normal on the basis of the detected or estimated drive shaft rotation speed and the detected motor rotation speed. Here, the drive shaft rotation speed detection or estimation module includes the drive shaft rotation speed detection module which detects the rotation speed of the drive shaft, the drive shaft rotation speed estimation module which estimates the rotation speed of the drive shaft and the like.

BRIEF DESCRIPTION OF THE DRAWINGS

FIG. 4 is a flowchart showing one example of rotation speed deviation abnormality determination processing;

FIG. 5 is a flowchart showing one example of stop determining rotation speed setting processing;

BEST MODE FOR CARRYING OUT THE INVENTION

Hereinafter, the best mode for carrying out the invention will be described with reference to embodiments.

Figure 1:
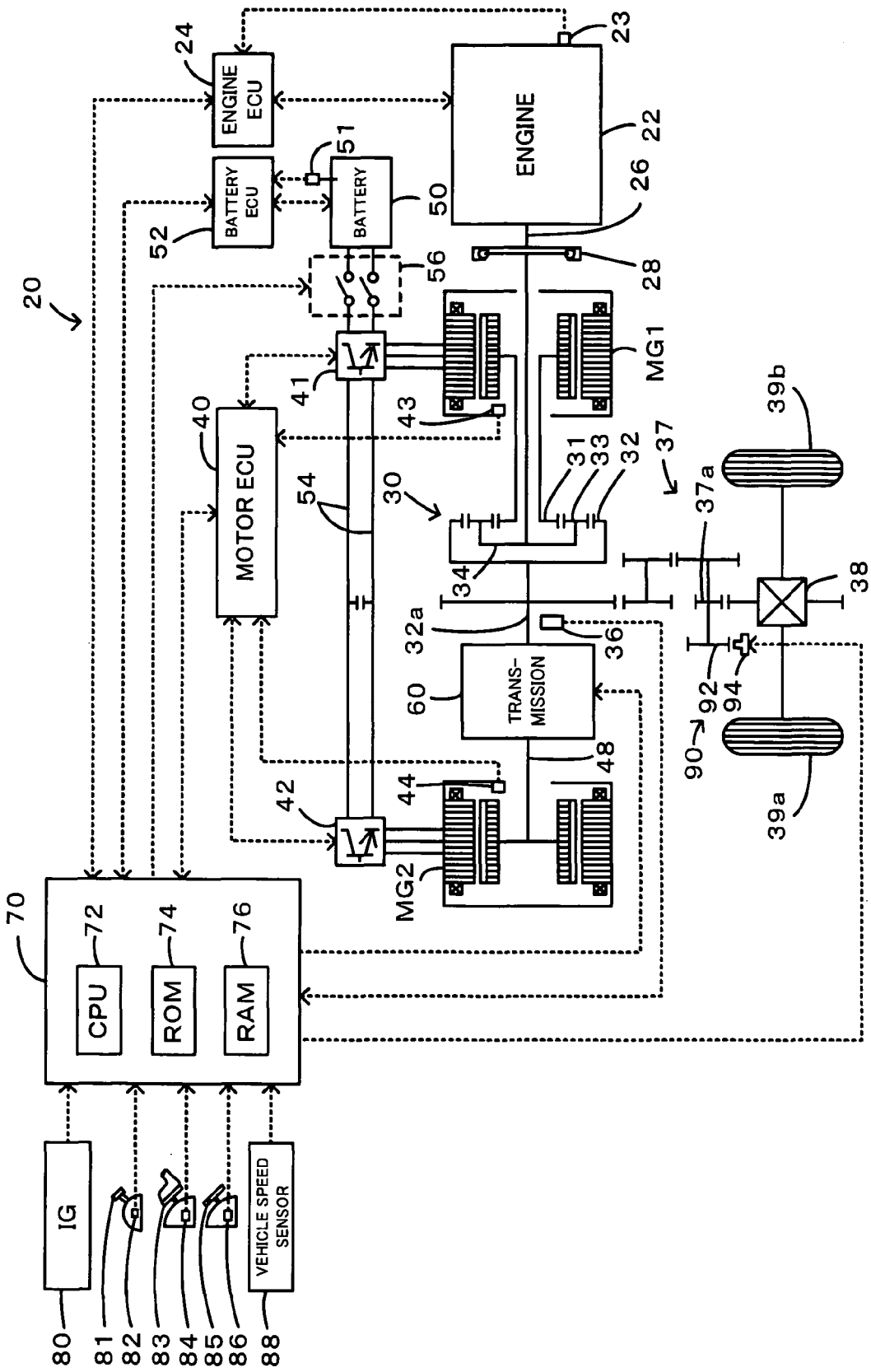
FIG. 1 is a configuration diagram showing the outline of the configuration of a hybrid vehicle 20 which is one embodiment of the present invention.

FIG. 1 is a configuration diagram showing the outline of the configuration of a hybrid vehicle 20 which is one embodiment of the present invention. The hybrid vehicle 20 of the embodiment includes, as shown in the figure, an engine 22, a three shaft-type power distribution and integration mechanism 30 connected to a crankshaft 26 as an output shaft of the engine 22 via a damper 28, a motor MG1 connected to the power distribution and integration mechanism 30 and capable of generating electric power, a motor MG2 connected to a ring gear shaft 32a as a drive shaft connected to the power distribution and integration mechanism 30, via a transmission 60, and a hybrid electronic control unit 70 which controls the entire vehicle.

The engine 22 is an internal combustion engine which outputs power by a hydrocarbon fuel such as gasoline or light oil, and is subjected to operation control such as fuel injection control, ignition control and intake air amount regulating control by an engine electronic control unit (hereinafter, called an engine ECU) 24. Signals from various sensors detecting the operation state of the engine 22, for example, a crank position from a crank position sensor 23 which detects the crank position of the crankshaft 26, and the like are input in the engine ECU 24. The crank position sensor 23 is configured as an electromagnetic pickup sensor having a timing rotor which is mounted to rotate synchronously with the rotation of the crankshaft 26, has teeth formed at the intervals of 10 degrees, and has two omitted teeth formed for detecting a reference position, and generates a shaped wave each time the crankshaft 26 rotates 10 degrees. The engine ECU 24 calculates the rotation speed of the engine 22 in accordance with an engine rotation speed calculation routine not illustrated based on the signal input from the crank position sensor 23. Hereinafter, the rotation speed of the engine 22 which is thus obtained will be described as a detected rotation speed Nedet. The engine ECU 24 communicates with the hybrid electronic control unit 70, and performs operation control of the engine 22 in accordance with the control signal from the hybrid electronic control unit 70, and outputs data relating to the operation state of the engine 22 to the hybrid electronic control unit 70 in accordance with necessity.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the transmission 60 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus transmitted to the driving wheels 39a and 39b via the gear mechanism 37, and the differential gear 38 from ring gear shaft 32a.

The gear mechanism 37 is mounted with a parking lock mechanism 90 constituted of a parking gear 92 mounted to a final gear 37a, and a parking lock pole 94 which engages and locks the parking gear 92 to stop its rotation. The parking lock pole 94 is operated by an actuator not illustrated being subjected to drive control by the hybrid electronic control unit 70 in which an operation signal to a parking position (P position) from another position, or an operation signal to another position from the parking position is input, and the parking lock pole 94 performs parking lock and release of it by meshing with the parking gear 92 and releasing from it. The final gear 37a is mechanically connected to the drive wheels 39a and 39b, and therefore, the parking lock mechanism 90 indirectly locks the drive wheels 39a and 39b.

The motor MG1 and the motor MG2 are configured as a known synchronous motor generators which can drive as generators and motors, and exchange electric power with a battery 50 via inverters 41 and 42. A power line 54 which connects the inverters 41 and 42 and the battery 50 is configured as a positive electrode bus line and a negative electrode bus line commonly used by each of the inverters 41 and 42 so that the electric power which is generated by any one of the motors MG1 and MG2 can be consumed by the other motor. Accordingly, the battery 50 is charged with electric power generated from any one of the motors MG1 and MG2, and discharges the electric power which any one of the motors MG1 and MG2 is short of. Further, the power line 54 is provided with a system main relay 56 which cuts off supply of the electric power to the inverters 41 and 42 from the battery 50. The motors MG1 and MG2 are both subjected to drive control by a motor electronic control unit (hereinafter, described as a motor ECU) 40. Signals necessary for drive control of the motors MG1 and MG2, for example, signals from rotational position detection sensors 43 and 44 (for example, resolvers or the like) which detect the rotational positions of the rotors of the motors MG1 and MG2, phase currents which are applied to the motors MG1 and MG2 which are detected by current sensors not illustrated, and the like are input in the motor ECU 40, and switching control signals to the inverters 41 and 42 are output from the motor ECU 40. The motor ECU 40 calculates the rotation speeds of the rotors of the motors MG1 and MG2 in accordance with a motor rotation speed calculation routine not illustrated on the basis of the signals input from the rotational position detection sensors 43 and 44. Hereinafter, the rotation speeds of the motors MG1 and MG2 thus obtained are described as detected rotation speeds Nm1det and Nm2det. The motor ECU 40 communicates with the hybrid electronic control unit 70, performs drive control of the motors MG1 and MG2 by the control signals from the hybrid electronic control unit 70, and outputs data concerning the operation states of the motors MG1 and MG2 to the hybrid electronic control unit 70 in accordance with necessity.

Figure 2:
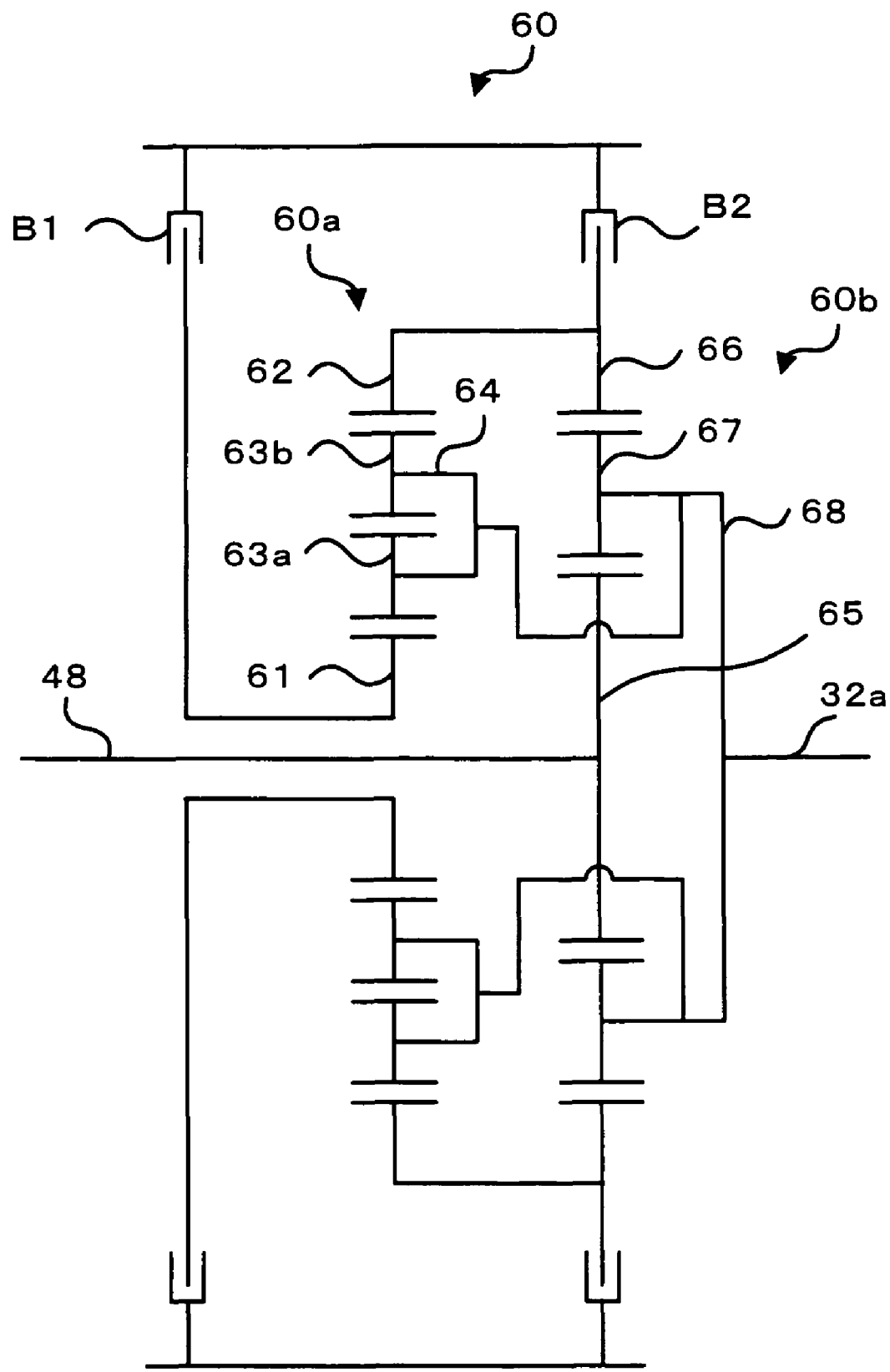
FIG. 2 is a configuration diagram showing the outline of the configuration of a transmission 60.

The transmission 60 is configured to connect a rotating shaft 48 of the motor MG2 and the ring gear shaft 32a, release the connection, and is capable of transmitting the connection of the both shafts to the ring gear shaft 32a by reducing the rotation speed of the rotating shaft 48 of the motor MG2 in two steps. An example of the configuration of the transmission 60 is shown in FIG. 2. The transmission 60 shown in FIG. 2 is configured by a double pinion planetary gear mechanism 60a and a single pinion planetary gear mechanism 60b, and two brakes B1 and B2. The double pinion planetary gear mechanism 60a includes a sun gear 61 which is an external gear, a ring gear 62 which is an internal gear and is placed on the concentric circle with the sun gear 61, a plurality of first pinion gears 63a which are meshed with the sun gear 61, a plurality of second pinion gears 63b which are meshed with the first pinion gears 63a and the ring gear 62, and a carrier 64 which connects a plurality of first pinion gears 63a and a plurality of second pinion gears 63b and holds them so that they can rotate and orbit. The sun gear 61 can make its rotation free or stop the rotation by turning on and off a brake B1. The single pinion planetary gear mechanism 60b includes a sun gear 65 which is an external gear, a ring gear 66 which is an internal gear placed on the concentric circle with the sun gear 65, a plurality of pinion gears 67 which are meshed with the sun gear 65 and meshed with the ring gear 66, and a carrier 68 which holds a plurality of pinion gears 67 so that they can rotate and orbit. The sun gear 65 is connected to the rotating shaft 48 of the motor MG2, the carrier 68 is connected to the ring gear shaft 32a, and the ring gear 66 can make its rotation free or stop the rotation by turning on and off a brake B2. The double pinion planetary gear mechanism 60a and the single pinion planetary gear mechanism 60b are respectively connected by the ring gears 62 and 66 and the carriers 64 and 68. The transmission 60 can separate the rotating shaft 48 of the motor MG2 from the ring gear shaft 32a by turning off both the brakes B1 and B2. The transmission 60 turns off the brake B1, and turns on the brake B2, thereby reduces the rotation of the rotating shaft 48 of the motor MG2 at a relatively large reduction ratio, and transmits the rotation to the ring gear shaft 32a (hereinafter, this state will be described as a Lo gear state). The transmission 60 turns on the brake B1 and off the brake B2, thereby reduces the rotation of the rotating shaft 48 of the motor MG2 at a relatively small reduction ratio, and transmits the rotation to the ring gear shaft 32a (hereinafter, this state will be described as a Hi gear state). The state in which the brakes B1 and B2 are both turned on prohibits the rotation of the rotating shaft 48 and the ring gear shaft 32a. The brakes B1 and B2 are turned on and off by regulating the hydraulic pressure which is caused to act on the brakes B1 and B2 by driving a hydraulic actuator not illustrated.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is configured as a microprocessor with a CPU 72 as a center, and includes a ROM 74 which stores a processing program, a RAM 76 which temporally stores data, and input and output ports and a communication port which are not illustrated, in addition to the CPU 72. A signal from a rotation speed sensor 36 which is configured as an electromagnetic pickup sensor and detects the rotation speed of the ring gear shaft 32a as a drive shaft, an ignition signal from an ignition switch 80, a shift position SP from a shift position sensor 82 which detects an operation position of a shift lever 81, an accelerator opening Acc from an accelerator pedal position sensor 84 which detects a depressing amount on an accelerator pedal 83, a brake pedal position BP from a brake pedal position sensor 86 which detects a depressing amount on a brake pedal 85, a vehicle speed V from a vehicle speed sensor 88 are input in the hybrid electronic control unit 70 via an input port. Further, a drive signal to a system main relay 56, drive signals to actuators not illustrated of the brakes B1 and B2 of the transmission 60, a drive signal to the actuator not illustrated of the parking lock mechanism 90 are output from the hybrid electronic control unit 70. The hybrid electronic control unit 70 calculates the rotation speed of the ring gear shaft 32a by a drive shaft rotation speed calculation routine not illustrated on the basis of the signal input from the rotation speed sensor 36. Hereinafter, the rotation speed thus obtained will be described as a detected rotation speed Nodet of the ring gear shaft 32a. The hybrid electronic control unit 70 is connected to the engine ECU 24, the motor ECU 40 and the battery ECU 52 via the communication port as described above, and exchanges various control signals and data with the engine ECU 24, the motor ECU 40 and the battery ECU 52.

In the hybrid vehicle 20 of the embodiment, the positions of the shift lever 81 which are detected by the shift position sensor 82 include a parking position (P position), a neutral position (N position), a drive position (D position), a reverse position (R position) and the like.

The hybrid vehicle 20 of the embodiment which is thus configured calculates torque demand to be output to the ring gear shaft 32a as the drive shaft on the basis of the accelerator opening Acc corresponding to the depressing amount on the accelerator pedal 83 by a driver and the vehicle speed V, and performs operation control for the engine 22, and the motors MG1 and MG2 so that the power demand corresponding to the torque demand is output to the ring gear shaft 32a. As the operation control of the engine 22, and the motors MG1 and MG2, there are cited a torque conversion operation mode of performing operation control of the engine 22 so that the power corresponding to the power demand is output from the engine 22, and of performing drive control of the motors MG1 and MG2 so that all the power output from the engine 22 is converted into torque by the power distribution and integration mechanism 30, and the motors MG1 and MG2, and is output to the ring gear shaft 32a, a charge and discharge operation mode of performing operation control of the engine 22 so that the power corresponding to the sum of the power demand and electric power required for charge and discharge of the battery 50 is output from the engine 22, and performing drive control of the motors MG1 and MG2 so that the power demand is output to the ring gear shaft 32a with all or part of the power, which is output from the engine 22 with charge and discharge of the battery 50, with torque conversion by the power distribution and integration mechanism 30, and the motors MG1 and MG2, and a motor operation mode of stopping the operation of the engine 22, and performing operation control so that the power corresponding to the power demand from the motor MG2 is output to the ring gear shaft 32a.

Figure 3:
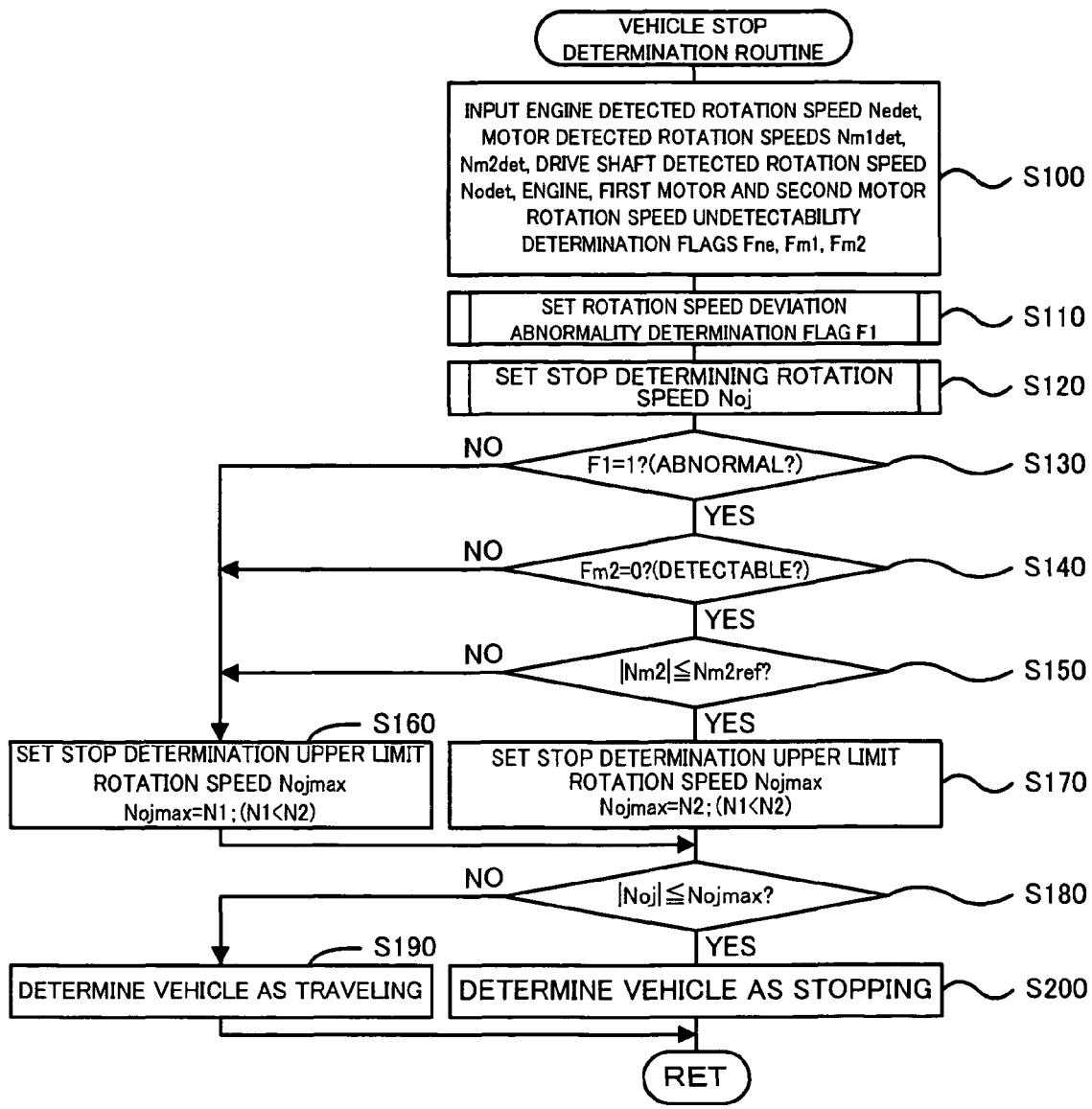
FIG. 3 is a flowchart showing one example of a vehicle stop determination routine which is executed by a hybrid electronic control unit 70.

Next, the operation of the hybrid vehicle 20 of the embodiment thus configured, the operation especially when it is determined whether or not the vehicle is stopping will be described. FIG. 3 is a flowchart showing one example of a vehicle stop determination routine which is executed by the hybrid electronic control unit 70. This routine is repeatedly executed every predetermined time (for example, every several msec). In this embodiment, under the condition that the vehicle is determined as stopping, the processing of locking the drive wheels 39a and 39b by the parking lock mechanism 90 in response to shift change of the shift position SP to the P position by a driver, and processing of cutting off the system main relay 56 in response to the ignition-off by the driver are performed. More specifically, the processing of locking the drive wheels 39a and 39b by the parking lock mechanism 90 is performed when the condition that the shift position SP is changed to the P position by the driver and the condition that the vehicle is determined as stopping are both established, whereas the processing of cutting off the system main relay 56 is performed when the condition that the ignition is turned off by the driver and the condition that the vehicle is determined as stopping are both established.

When the vehicle stop determination routine is executed, the CPU 72 of the hybrid electronic control unit 70 first executes the processing of inputting data such as the detected rotation speed Nedet of the engine 22, the detected rotation speeds Nm1det and Nm2det of the motors MG1 and MG2, the detected rotation speed Nodet of the ring gear shaft 32a as the drive shaft, rotation speed undetectability determination flags Fne, Fm1 and Fm2 of the engine, and the motors MG1 and MG2 (step S100). Here, the detected rotation speed Nedet of the engine 22, which is calculated on the basis of the signal from the crank position sensor 23 mounted to the crankshaft 26 is input from the engine ECU 24 by communication. Further, the detected rotation speeds Nm1det and Nm2det of the motors MG1 and MG2 which are calculated based on the rotational positions of the rotors of the motor MG1 and MG2 which are detected by the rotational position detection sensors 43 and 44 are input from the motor ECU 40 by communication. The detected rotation speed Nodet of the ring gear shaft 32a as the drive shaft which is calculated on the basis of the signal from the rotation speed sensor 36 and written in a predetermined address of the RAM 76 is read, and thereby input. The engine rotation speed undetectability determination flag Fne, which is obtained as the result of determining whether or not the detected rotation speed Nedet of the engine 22 can be obtained on the basis of whether or not abnormality occurs to the crank position sensor 23, whether or not the signal from the crank position sensor 23 stops for a predetermined time, and the like (value 0 when the detected rotation speed Nedet can be obtained, value 1 when it cannot be obtained) is input from the engine ECU 24 by communication. The rotation speed undetectability determination flags Fm1 and Fm2 of the motors MG1 and MG2, which is obtained as the result of determining whether or not the detected rotation speeds Nm1det and Nm2det of the motors MG1 and MG2 can be obtained on the basis of whether or not abnormality occurs to the rotational position detection sensors 43 and 44, whether or not the signals from the rotational position detection sensors 43 and 44 stop for a predetermined time, and the like (value 0 when the detected rotation speeds Nm1det and Nm2det can be obtained, and value 1 when they cannot be obtained) are input respectively from the motor ECU 40 by communication. In the embodiment, the crank position sensor 23 and the rotation speed sensor 36 are configured as the electromagnetic pickup sensors. Therefore, when they are subjected to the influence of the magnetic field from outside, the detected rotation speed Nedet of the engine 22 and the detected rotation speed Nodet of the ring gear shaft 32a as the drive shaft sometimes become the rotation speeds of some degrees by the influence of the magnetic field from outside when the engine 22 and the ring gear shaft 32a substantially stop rotating. For example, considering the situation in which a vehicle stops in the position where a road heater for melting snow is buried in a road in a cold district or the like, the detected rotation speed Nodet of the ring gear shaft 32a sometimes becomes a rotation speed of some degree due to the influence of the magnetic field which occurs in accordance with the current passed to the road heater, even though the ring gear shaft 32a actually stops and the vehicle stops. Meanwhile, as the rotational position detection sensors 43 and 44 for which resolvers or the like are used, those that are hardly susceptible to the influence of the magnetic field from such a road heater (for example, those detecting the rotational positions of the rotors of the motors MG1 and MG2 in accordance with a very large magnetic field as compared with the magnetic field from a road heater) are used in the embodiment. Accordingly, when the rotational position detection sensors 43 and 44 are normal, the detected rotation speeds Nm1 and Nm2 of the motors MG1 and MG2 become substantially value 0 when the motors MG1 and MG2 stop rotating.

When data is thus input, the value of a rotation speed deviation abnormality determination flag F is set by rotation speed deviation abnormality determination processing shown in FIG. 4 as an example on the basis of the detected rotation speed Nodet of the ring gear shaft 32a and the detected rotation speed Nm2det of the motor MG2 which are input (step S110). The rotation speed deviation abnormality determination flag F is a flag showing whether or not the detected rotation speed Nodet of the ring gear shaft 32a and the detected rotation speed Nm2det of the motor MG2 are both normal values. Value 0 is set when the detected rotation speed Nodet of the ring gear shaft 32a and the detected rotation speed Nm2det of the motor MG2 are both normal values, and value 1 is set when at least one value of the detected rotation speed Nodet of the ring gear shaft 32a and the detected rotation speed Nm2det of the motor MG2 is not normal. Hereinafter, the description of the vehicle stop determination routine of FIG. 3 is temporarily stopped, and the rotation speed deviation abnormality determination processing of FIG. 4 will be described.

In the rotation speed deviation abnormality determination processing, the value of the second motor rotation speed undetectability determination flag F2 is checked first (step 300), and when the second motor rotation speed undetectability determination flag F2 is value 0, an estimated rotation speed Nm2est which is the rotation speed of the motor MG2 estimated on the basis of the detected rotation speed Nodet of the ring gear shaft 32a is calculated by multiplying the detected rotation speed Nodet of the ring gear shaft 32a by a gear ratio Gr (a gear ratio Glo of the Lo gear state, or a gear ratio Ghi of the Hi gear state) of the transmission 60 (step S310), and a rotation speed deviation ΔNm2 (=|Nm2det−Nm2est|) as the deviation between the detected rotation speed Nm2det and the estimated rotation speed Nm2est of the motor MG2 is calculated (step S320). Subsequently, the rotation speed deviation ΔNm2 is compared with a threshold value ΔNm2ref (step S330), and when the rotation speed deviation ΔNm2 is larger than the threshold value ΔNm2ref, it is determined whether or not that state continues for a predetermined time (step S340). Here, the threshold value ΔNm2ref is the threshold value which is used for determining whether or not the deviation between the detected rotation speed Nm2det and the estimated rotation speed Nm2est of the motor MG2 is normal, that is, whether or not the detected rotation speed Nm2 calculated on the basis of the signal from the rotational position detection sensor 44 and the detected rotation speed Nodet calculated on the basis of the signal from the rotation speed sensor 36 are both normal values, and can be set to, for example, 450 rpm, 500 rpm, 550 rpm or the like. Further, the predetermined time is the time required for determining that the deviation between the detected rotation speed Nm2det and the estimated rotation speed Nm2est of the motor MG2 is not normal, and can be set to, for example, 80 msec, 100 msec, 120 msec or the like. Now, considering the time when the vehicle stops at a position where a road heater is buried in a road, the detected rotation speed Nodet of the ring gear shaft 32a sometimes becomes a rotation speed of some degree due to the magnetic field from the road heater as described above, but the detected rotation speed Nm2det of the motor MG2 becomes substantially value 0, and therefore, a deviation sometimes occurs between the detected rotation speed Nm2det and the estimated rotation speed Nm2est of the motor MG2. For the other reason than the influence of the magnetic field from the road heater, a deviation occurs between the detected rotation speed Nm2det of the motor MG2 or the detected rotation speed Nodet of the ring gear shaft 32a, and the respective actual rotation speeds, and with this, a deviation sometimes occurs between the detected rotation speed Nm2det and the estimated rotation speed Nm2est of the motor MG2. The processing of steps S330 and S340 is the processing of determining whether or not the detected rotation speed Nm2det of the motor MG2 and the detected rotation speed Nodet of the ring gear shaft 32a are both normal values by using the rotation speed deviation ΔNm2. Even when the rotation speed deviation ΔNm2 is the threshold value ΔNm2ref or less, or even when the rotation speed deviation ΔNm2 is larger than the threshold value ΔNm2ref, if the value does not continue for a predetermined time, it is determined that the detected rotation speed Nm2det of the motor MG2 and the detected rotation speed Nodet of the ring gear shaft 32a are both normal values, and value 0 is set in the rotation speed deviation abnormality determination flag F1 (step S350) to set the rotation speed deviation abnormality determination processing. Meanwhile, when the state in which the rotation speed deviation ΔNm2 is larger than the threshold value ΔNm2ref continues for a predetermined time, or when the second motor rotation speed undetectability determination flag F is value 1 in step S300, it is determined that at least one of the detected rotation speed Nm2det of the motor MG2 and the detected rotation speed Nodet of the ring gear shaft 32a is not a normal value, or the detected rotation speed Nm2det itself of the motor MG2 cannot be obtained, and value 1 is set in the rotation speed deviation abnormality determination flag F1 (step S360) to finish the rotation speed deviation abnormality determination processing.

When the flow returns to the vehicle stop determination routine of FIG. 3 and the rotation speed deviation abnormality determination flag F1 is set in step S110, a stop determining rotation speed Noj is set by the stop determining rotation speed setting processing shown in FIG. 5 as an example (step S120). Here, the stop determining rotation speed Noj is the rotation speed of the ring gear shaft 32a as a drive shaft which is used when it is determined whether or not the vehicle is stopping. Hereinafter, the description of the vehicle stop determination routine of FIG. 3 is temporally stopped, and the stop determining rotation speed setting processing of FIG. 5 will be described.

In the stop determining rotation speed setting processing, the value of the rotation speed deviation abnormality determination flag F1 is checked first (step S400). When the rotation speed deviation abnormality flag F1 is value 0, that is, when the detected rotation speed Nm2det of the motor MG2 and the detected rotation speed Nodet of the ring gear shaft 32a are both normal values, the detected rotation speed Nodet of the ring gear shaft 32a is set as the stop determining rotation speed Noj (step S410), and the stop determining rotation speed setting processing is finished.

Figure 6:
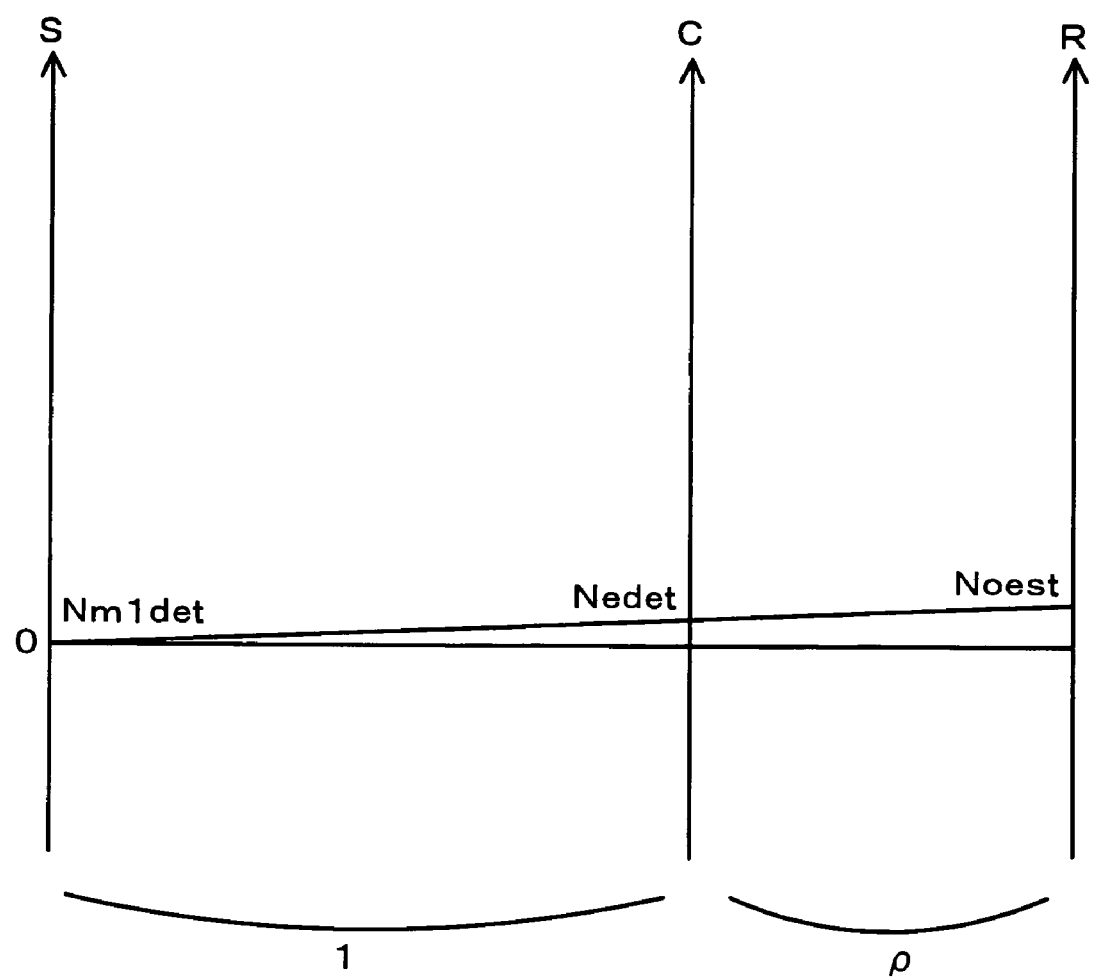
FIG. 6 is an alignment chart showing one example of the relationship of the rotation speeds of the rotational elements of a power distribution and integration mechanism 30.

Meanwhile, when the rotation speed deviation abnormality determination flag F1 is value 1, that is, when at least one of the detected rotation speed Nm2det of the motor MG2 and the detected rotation speed Nodet of the ring gear shaft 32a is not a normal value, the value of an engine rotation speed undetectability determination flag Fne and the value of a first motor rotation speed undetectability determination flag Fm1 are checked (steps S420 and S430), and when the engine rotation speed undetectability determination flag Fne and the first motor rotation speed undetectability determination flag Fm1 are both value 0, that is, when the detected rotation speed Nedet of the engine 22 can be obtained, and the detected rotation speed Nm1det of the motor MG1 can be obtained, the estimated rotation speed Noest which is the rotation speed of the ring gear shaft 32a as the drive shaft which is estimated on the basis of the detected rotation speed Nedet of the engine 22 and the detected rotation speed Nm1 of the motor MG1 is calculated from the following formula (1) (step S440), and the calculated estimated rotation speed Noest is set as the stop determining rotation speed Noj (step S450). Thus, the stop determining rotation speed setting processing is finished. The alignment chart showing the relationship of the rotation speeds in the rotational elements of the power distribution and integration mechanism 30 is shown in FIG. 6. In the drawing, the S-axis at the left side represents the rotation speed of the sun gear 31, which is the rotation speed of the motor MG1, the C-axis represents the rotation speed of the carrier 34, which is the rotation speed of the engine 22, and the R-axis represents the rotation speed of the ring gear 32, which is obtained by dividing the rotation speed of the motor MG2 by the gear ratio Gr of the reduction gear 35. Formula (1) can be easily derived by using the alignment chart. The reason why the estimated rotation speed Noest of the ring gear shaft 32a is set as the stop determining rotation speed Noj when the rotation speed deviation abnormality determination flag F is value 1 is that in the rotation speed deviation abnormality determination processing of FIG. 4, it can be determined only that at least one of the detected rotation speed Nm2det of the motor MG2 and the detected rotation speed Nodet of the ring gear shaft 32a is not a normal value, or that the detected rotation speed Nm2det of the motor MG2 itself cannot be obtained, namely, it cannot be determined whether or not the detected rotation speed Nodet of the ring gear shaft 32a is the rotation speed influenced by the magnetic field from the road heater. When it is considered that the vehicle is stopping at the position where the road heater is buried in the road, the detected rotation speed Nedet of the engine 22 becomes a rotation speed of some degree though the engine 22 actually stops rotation as described above, and therefore, the estimated rotation speed Noest of the ring gear shaft 32a sometimes does not become value 0.

$$Noest = Nedet \cdot (1+\rho) - Nm1det \cdot \rho \quad (1)$$

When at least one of the engine rotation speed undetectability determination flag Fne and the first motor rotation speed undetectability determination flag Fm1 is value 1 in steps S420 and 430, namely, when at least one of the detected rotation speed Nedet of the engine 22 and the detected rotation speed Nm1det of the motor MG1 cannot be obtained, the absolute value of the detected rotation speed Nodet of the ring gear shaft 32a is compared with the threshold value Noref (step S460), whereas when the absolute value of the detected rotation speed Nodet of the ring gear shaft 32a is larger than the threshold value Noref, the detected rotation speed Nodet is set as the stop determining rotation speed Noj (step S470), and the stop determining rotation speed setting processing is finished. When the absolute value of the detected rotation speed Nodet of the ring gear shaft 32a is the threshold value Noref or less, value 0 is set as the stop determining rotation speed Noj (step S480), and the stop determining rotation speed setting routine is finished. Here, the threshold value Noref is set at the rotation speed or the like which is a little larger than the detected rotation speed Nodet of the ring gear shaft 32a which is detected due to the influence of the magnetic field from a road heater when the vehicle is stopping at a position where the road heater is buried in the road surface, and is fixed in advance from an experiment or the like. By the processing of steps S460 to S480, the detected rotation speed Nodet of the ring gear shaft 32a is set as the stop determining rotation speed Noj when the vehicle travels at some vehicle speed, and when the vehicle stops, value 0 is set as the stop determining rotation speed Noj instead of the detected rotation speed Nodet of the ring gear shaft 32a which is influenced by the magnetic field from the road heater.

The flow will be returned to the description of the vehicle stop determination routine of FIG. 3. When the stop determining rotation speed Noj is set in step S120, the value of the rotation speed deviation abnormality determination flag F1 is checked (step S130). When the rotation speed deviation abnormality determination flag F1 is value 0, namely, when the detected rotation speed Nm2det of the motor MG2 and the detected rotation speed Nodet of the ring gear shaft 32a are both normal values, a predetermined rotation speed N1 is set as a stop determination upper limit rotation speed Nojmax as the upper limit of the rotation speed with which the vehicle can be determined as stopping (step S160). Subsequently, the stop determining rotation speed Noj of the ring gear shaft 32a and the stop determination upper limit rotation speed Nojmax are compared (step S180). When the absolute value of the stop determining rotation speed Noj of the ring gear shaft 32a is the stop determination upper limit rotation speed Nojmax or less, it is determined that the vehicle is stopping (step S190), and the vehicle stop determination routine is finished. When the stop determining rotation speed Noj of the ring gear shaft 32a is larger than the stop determination upper limit rotation speed Nojmax, it is determined that the vehicle is not stopping, namely, that the vehicle is traveling (step S200), and the vehicle stop determination routine is finished. Here, the predetermined rotation speed N1 is the upper limit of the rotation speed of the ring gear shaft 32a with which it can be determined that the vehicle is stopping when it is not influenced by the magnetic field from the road heater, and is fixed in advance from the experiment or the like. When the rotation speed deviation abnormality determination flag F1 is value 0, that is, when the detected rotation speed Nm2det of the motor MG2 and the detected rotation speed Nodet of the ring gear shaft 32a are both normal values, the detected rotation speed Nodet of the ring gear shaft 32a is set as the stop determining rotation speed Noj by the stop determining rotation speed setting processing of FIG. 5 described above, and therefore, it is determined whether or not the vehicle is stopping by using the detected rotation speed Nodet of the ring gear shaft 32a.

Figure 7:
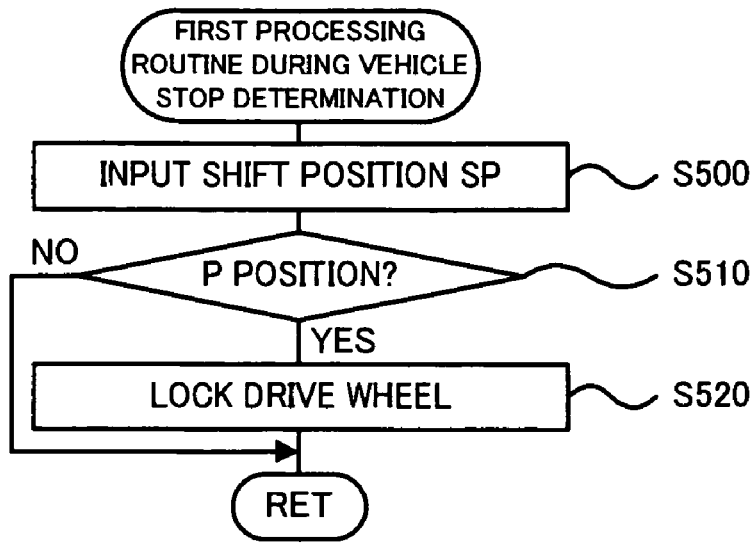
FIG. 7 is a flowchart showing one example of a first processing routine during vehicle stop determination which is executed by the hybrid electronic control unit 70.
Figure 8:
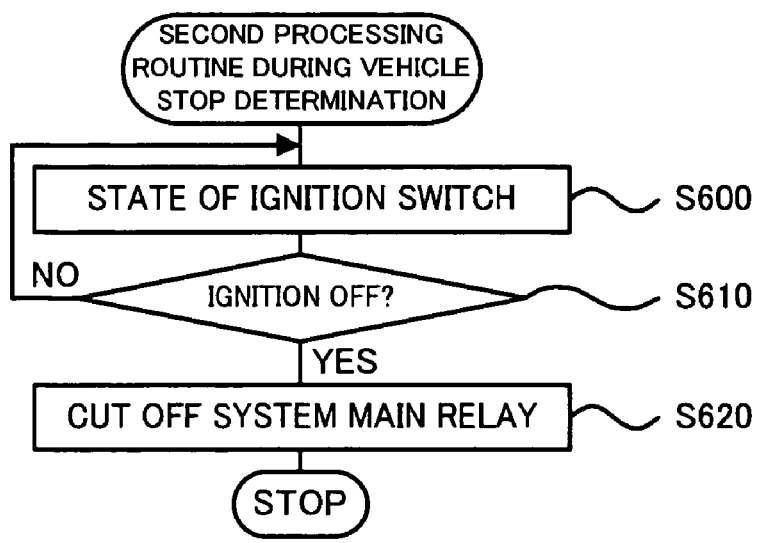
FIG. 8 is a flowchart showing one example of a second processing routine during vehicle stop determination which is executed by the hybrid electronic control unit 70.

When the vehicle is thus determined as stopping, the hybrid electronic control unit 70 executes a first processing routine during vehicle stop determination which is shown in FIG. 7 as an example, and a second processing routine during vehicle stop determination which is shown in FIG. 8 as an example in parallel with the vehicle stop determination routine of FIG. 3. In the first processing routine during vehicle stop determination of FIG. 7, a shift position SP is input (step S500), and the input shift position SP is checked (step S510).

When the shift position SP is a P position, the drive wheels 39*a* and 39*b* are locked by the parking lock mechanism 90 (step S520), and when the shift position SP is other than the P position, the present routine is finished without locking the drive wheels 39*a* and 39*b*. Further, in the second processing routine during vehicle stop determination of FIG. 8, the state of an ignition switch 80 is input (step S600), and it is determined whether or not the ignition is turned off on the basis of the input state of the ignition switch 80 (step S610). When it is determined that the ignition is not turned off, the flow returns to the processing of step S600, and when it is determined that the ignition is turned off, the system main relay 56 is cut off (step S610), and the present routine is finished. More specifically, in the routines of FIG. 7 and FIG. 8 which are executed when the vehicle is determined as stopping, when the shift position SP is changed to the P position by the driver, the drive wheels 39*a* and 39*b* are locked by the parking lock mechanism 90 in response to the shift change, and when the ignition is turned off by the driver, the system main relay 56 is cut off. In the embodiment, when it is determined that the vehicle is not stopping, that is, the vehicle is traveling, the drive wheels 39*a* and 39*b* are not locked by the parking lock mechanism 90 even if the shift position SP is operated to shift to the P position, and the system main relay 56 is not cut off even if the ignition is turned off.

The flow will be returned to the description of the vehicle stop determination routine of FIG. 3. When the rotation speed deviation abnormality determination flag F1 is value 1 in step S130, that is, when at least one of the values of the detected rotation speed Nm2det of the motor MG2 and the detected rotation speed Nodet of the ring gear shaft 32*a* is not normal, the value of a second motor rotation speed undetectability determination flag Fm2 is checked (step S140), and when the second motor rotation speed undetectability determination flag Fm2 is value 0, namely, when the detected rotation speed Nm2det of the motor MG2 can be obtained, the absolute value of the detected rotation speed Nm2det of the motor MG2 is compared with a threshold value Nm2ref (step 150). Here, the threshold value Nm2ref is the upper limit of the absolute value of the rotation speed of the motor MG2 with which the vehicle can be determined as stopping, and is fixed in advance by an experiment or the like. In the embodiment, the rotation speed which is obtained by multiplying the predetermined rotation speed N1 by the gear ratio Gr of the transmission 60 or the like is set as the threshold value Nm2ref. The rotational position detection sensor 44 is not influenced by the magnetic field from a road heater, and therefore, in this case, the processing of steps S140 and S150 is the processing of determining whether or not the vehicle is stopping by using the detected rotation speed Nm2det of the motor MG2 which is not influenced by such a magnetic field.

When the second motor rotation speed undetectability determination flag Fm2 is value 0, and the absolute value of the detected rotation speed Nm2det of the motor MG2 is the threshold value Nm2ref or less, it is judged that the vehicle is determined as stopping if it is determined whether or not the vehicle is stopping by using the detected rotation speed Nm2det of the motor MG2. Thus, a predetermined rotation speed N2 which is larger than the aforementioned predetermined rotation speed N1 is set as the stop determination upper limit rotation speed Nojmax (step S170), and the stop determining rotation speed Noj of the ring gear shaft 32*a* and the stop determination upper limit rotation speed Nojmax are compared (step S180). When the absolute value of the stop determining rotation speed Noj of the ring gear shaft 32*a* is the stop determination upper limit rotation speed Nojmax or less, it is determined that the vehicle is stopping (step S190), and the vehicle stop determination routine is finished. When the stop determining rotation speed Noj of the ring gear shaft 32*a* is larger than the stop determination upper limit rotation speed Nojmax, it is determined that the vehicle is not stopping, namely, the vehicle is running (step S200), and the vehicle stop determination routine is finished. Here, the predetermined rotation speed N2 is the upper limit of the rotation speed of the ring gear shaft 32*a* with which it is determined that the vehicle is stopping when the vehicle is influenced by the magnetic field from the road heater, is set to a rotation speed which is a little larger than the detected rotation speed Nodet and the estimated rotation speed Noest of the ring gear shaft 32*a* which is detected and estimated when the vehicle is stopping at the position where the road heater is buried in the road, and is fixed in advance from an experiment or the like.

Now, the occasion is considered, in which the vehicle is stopping at the position where the road heater is buried in a road surface, the detected rotation speed Nedet of the engine 22 can be obtained, and the detected rotation speed Nm1de of the motor MG1 can be obtained. At this time, when value 1 is set to the rotation speed deviation abnormality determination flag F1 by the rotation speed deviation abnormality determination processing of FIG. 4, specifically, when it is determined that at least one of the detected rotation speed Nm2det of the motor MG2 and the detected rotation speed Nodet of the ring gear shaft 32*a* is not a normal value, the estimated rotation speed Noest of the ring gear shaft 32*a* which is calculated from formula (I) on the basis of the detected rotation speed Nedet of the engine 22 and the detected rotation speed Nm1det of the motor MG1 is set as the stop determining rotation speed No by the stop determination rotation speed setting processing of FIG. 5. Here, the detected rotation speed Nedet of the engine 22 does not sometimes become value 0 due to the influence of the magnetic field from the road heater, and in this case, from the alignment chart of FIG. 6, the rotation speed corresponding to the detected rotation speed Ne of the engine 22 and the detected rotation speed Nm1 of the motor MG1 is the estimated rotation speed Noest of the ring gear shaft 32*a*. Accordingly, if the predetermined rotation speed N1 which is relatively small is set as the stop determination upper limit rotation speed Nojmax irrespective of the value of the rotation speed deviation abnormality determination flag F, it is determined that the vehicle is traveling though the vehicle is stopping, and it may happen that the drive wheels 39*a* and 39*b* are not locked by the parking lock mechanism 90 with the shift operation to the P position of the shift position SP, or the system main relay 56 is not cut off when the ignition is turned off. In order to eliminate such inconvenience, in the embodiment, when at least one of the detected rotation speed Nm2det of the motor MG2 and the detected rotation speed Nodet of the ring gear shaft 32*a* is not a normal value, and when the detected rotation speed Nm2det of the motor MG2 can be obtained and the absolute value of the detected rotation speed Nm2det of the motor MG2 is the threshold value Nm2ref or less, namely, when it can be judged that the vehicle is determined as stopping if the detected rotation speed Nm2det of the motor MG2 is used, the predetermined rotation speed N2 which is larger than the predetermined rotation speed N1 is set as the stop determination upper limit rotation speed Nojmax, and it is determined whether or not the vehicle is stopping by using the estimate rotation speed Noest of the ring gear shaft 32*a* or the stop determining rotation speed Noj to which value 0 is set, and the stop determination upper limit rotation speed Nojmax. Thereby, even when the detected rotation speed Nedet of the engine 22 and the detected rotation speed Nodet of the ring gear shaft 32a respectively generate deviations from the actual rotation speeds due to influence of the magnetic field from the road heater, it can be properly determined whether or not the vehicle is stopping. As a result, more proper response can be made to the shift operation to the P position of the shift position SP by the driver and turning-off of the ignition. When the predetermined rotation speed N2 which is larger than the predetermined rotation speed N1 is set as the stop determination upper limit rotation speed Nojmax irrespective of the value of the rotation speed deviation abnormality determination flag F, the range of the rotation speed of the ring gear shaft 32a with which the vehicle is determined as stopping is increased, the range in which the drive wheels 39a and 39b are locked when the shift position SP is operated to shift to the P position is increased, and there is the fear of giving a shock to the driver. Therefore, when the detected rotation speed Nodet of the ring gear shaft 32a is not influenced by the magnetic field from the road heater, it is desirable to set the relatively small predetermined rotation speed N1 as the stop determination upper limit rotation speed Nojmax.

When the second motor rotation speed undetectability determination flag Fm2 is value 1 in steps S140 and S150, namely, when the detected rotation speed Nm2det of the motor MG2 cannot be obtained, or when the second motor rotation speed undetectability determination flag Fm2 is value 0 and the absolute value of the detected rotation speed Nm2det of the motor MG2 is larger than the threshold value Nm2ref, the predetermined rotation speed N1 is set as the determination upper limit rotation speed Nojmax (step S160), the stop determining rotation speed Noj of the ring gear shaft 32a and the stop determination upper limit rotation speed Nojmax are compared (step S180). When the absolute value of the stop determining rotation speed Noj of the ring gear shaft 32a is the stop determination upper limit rotation speed Nojmax or less, it is determined that the vehicle is stopping (step S190), and the vehicle stop determination routine is finished. When the stop determining rotation speed Noj of the ring gear shaft 32a is larger than the stop determination upper limit rotation speed Nojmax, it is determined that the vehicle is not stopping, namely, that the vehicle is traveling (step S200), and the vehicle stop determination routine is finished. In these cases, as the stop determining rotation speed Noj, any one of the estimated rotation speed Noest and the detected rotation speed Nodet of the ring gear shaft 32a, and value 0 is set by the stop determining rotation speed setting processing of FIG. 5. The reasons of using the predetermined rotation speed N1 as the stop determination upper limit rotation speed Nojmax in these cases are as follows. First, when the detected rotation speed Nm2det of the motor MG2 cannot be obtained, the reason why the rotation speed deviation abnormality determination flag F is value 1 cannot be judged, namely, it cannot be judged whether or not value 1 is set as the rotation speed deviation abnormality determination flag F due to the fact that the rotation speed Nodet of the ring gear shaft 32a is the rotation speed which is subjected to the influence of the magnetic field from the road heater. Further, when the absolute value of the detected rotation speed Nm2det of the motor MG2 is larger than the threshold value Nm2ref, it can be ordinarily judged that the vehicle is determined as traveling if it is determined whether or not the vehicle is stopping by using the detected rotation speed Nm2det of the motor MG2 which is not influenced by the magnetic field from the road heater, and therefore, if it is determined whether or not the vehicle is stopping by using the predetermined rotation speed N2, it is easily determined that the vehicle is stopping when the vehicle is actually traveling.

According to the hybrid vehicle 20 of the embodiment described above, when the detected rotation speed Nm2det of the motor MG2 and the detected rotation speed Nodet of the ring gear shaft 32a are both normal values, it is determined whether or not the vehicle is stopping on the basis of whether or not the absolute value of the stop determining rotation speed Noj of the ring gear shaft 32a as the drive shaft is the predetermined rotation speed N1 or less, and when at least one value of the detected rotation speed Nm2det of the motor MG2 and the detected rotation speed Nodet of the ring gear shaft 32a is not normal, it is determined whether or not the vehicle is stopping on the basis of whether or not the absolute value of the stop determining rotation speed Noj of the ring gear shaft 32a as the drive shaft is the predetermined rotation speed N2 which is larger than the predetermined rotation speed N1, or less. Therefore, it can be more properly determined whether or not the vehicle is stopping as compared with the one which determines whether or not the vehicle is stopping by using the predetermined rotation speed N1 irrespective of whether or not the detected rotation speed Nm2det of the motor MG2 and the detected rotation speed Nodet of the ring gear shaft 32a are both normal values.

Further, according to the hybrid vehicle 20 of the embodiment, it is determined whether or not the detected rotation speed Nm2det of the motor MG2 and the detected rotation speed Nodet of the ring gear shaft 32a are both normal values on the basis of the rotation speed deviation $\Delta Nm2$ as the deviation of the detected rotation speed Nm2det and the estimated rotation speed Nm2est (=Nodet·Gr) of the motor MG2. Therefore, even if the ignition is turned on, it can be determined whether or not the detected rotation speed Nm2det of the motor MG2 and the detected rotation speed Nodet of the ring gear shaft 32a are both normal values. It is determined whether or not the vehicle is stopping with consideration being given to the result thus determined, and therefore, the shift operation to the P position of the shift position SP by the driver and turnoff of the ignition can be more properly handled.

Further, according to the hybrid vehicle 20 of the embodiment, the stop determining rotation speed Noj is set on the basis of whether or not the detected rotation speed Nm2det of the motor MG2 and the detected rotation speed Nodet of the ring gear shaft 32a are both normal values, and whether or not the detected rotation speed Nedet of the engine 22 and the detected rotation speed Nm1det of the motor MG1 can be obtained, and therefore, the stop determining rotation speed Noj can be more properly set in accordance with whether or not the vehicle is subjected to the influence from the road heater, the states of the crank position sensor 23 and the rotational position detection sensor 43 and the like. In addition, when at least one of the detected rotation speed Nm2det of the motor MG2 and the detected rotation speed Nodet of the ring gear shaft 32a is not a normal value, and at least one of the detected rotation speed Nedet of the engine 22 and the detected rotation speed Nm1det of the motor MG1 cannot be obtained, the detected rotation speed Nodet or value 0 is set as the stop determining rotation speed Noj on the basis of the result of comparing the detected rotation speed Nodet of the ring gear shaft 32a with the threshold value Noref for which the rotation speed which is a little larger than the detected rotation speed Nodet of the ring gear shaft 32a which is detected due to the influence of the magnetic field from the road heater when the vehicle is stopping in the position where the road heater is buried in the road surface. Therefore, it can be more reliably determined that the vehicle is stopping when the vehicle is actually stopping.

In the hybrid vehicle 20 of the embodiment, value 1 is set to the rotation speed deviation abnormality determination flag F1 when the state in which the rotation speed deviation ΔNm2 as the deviation between the detected rotation speed Nm2det of the motor MG2 and the estimated rotation speed Nm2est (=Nodet·Gr) of the motor MG2 is larger than the threshold value ΔNm2ref continues for a predetermined time. However, when the rotation speed deviation ΔNm2 is larger than the threshold value ΔNm2ref, value 1 may be set as the rotation speed deviation abnormality determination flag F1 without waiting for continuation for the predetermined time.

In the hybrid vehicle 20 of the embodiment, when the rotation speed deviation abnormality determination flag F1 is value 0, the detected rotation speed Nodet of the ring gear shaft 32a as the drive shaft is set as the stop determining rotation speed Noj, but instead of this, the estimated rotation speed Noest2 of the ring gear shaft 32a which is obtained by dividing the detected rotation speed Nm2det of the motor MG2 by the gear ratio Gr of the transmission 60 may be set as the stop determining rotation speed Noj.

In the hybrid vehicle 20 of the embodiment, when the rotation speed deviation abnormality determination flag F1 is value 1, if the engine rotation speed undetectability determination flag Fne and the first motor rotation speed undetectability determination flag Fm1 are both value 0, the estimated rotation speed Noest2 which is calculated by using the detected rotation speed Ne of the engine 22 and the detected rotation speed Nm1 of the motor MG1 is set as the stop determining rotation speed Noj. However, instead of this, the detected rotation speed Nodet of the ring gear shaft 32a may be set as the stop determining rotation speed Noj.

In the hybrid vehicle 20 of the embodiment, when the rotation speed deviation abnormality determination flag F1 is value 1, and at least one of the engine rotation speed undetectability determination flag Fne and the first motor rotation speed undetectability determination flag Fm1 is value 1, the detected rotation speed Nodet is set as the stop determining rotation speed Noj when the absolute value of the detected rotation speed Nodet of the ring gear shaft 32a is larger than the threshold value Noref, and value 0 is set as the stop determining rotation speed Noj when the absolute value of the detected rotation speed Nodet of the ring gear shaft 32a is the threshold value Noref or less. However, irrespective of the absolute value of the detected rotation speed Nodet of the ring gear shaft 32a, the detected rotation speed Nodet may be set as the stop determining rotation speed Noj.

Figure 9:
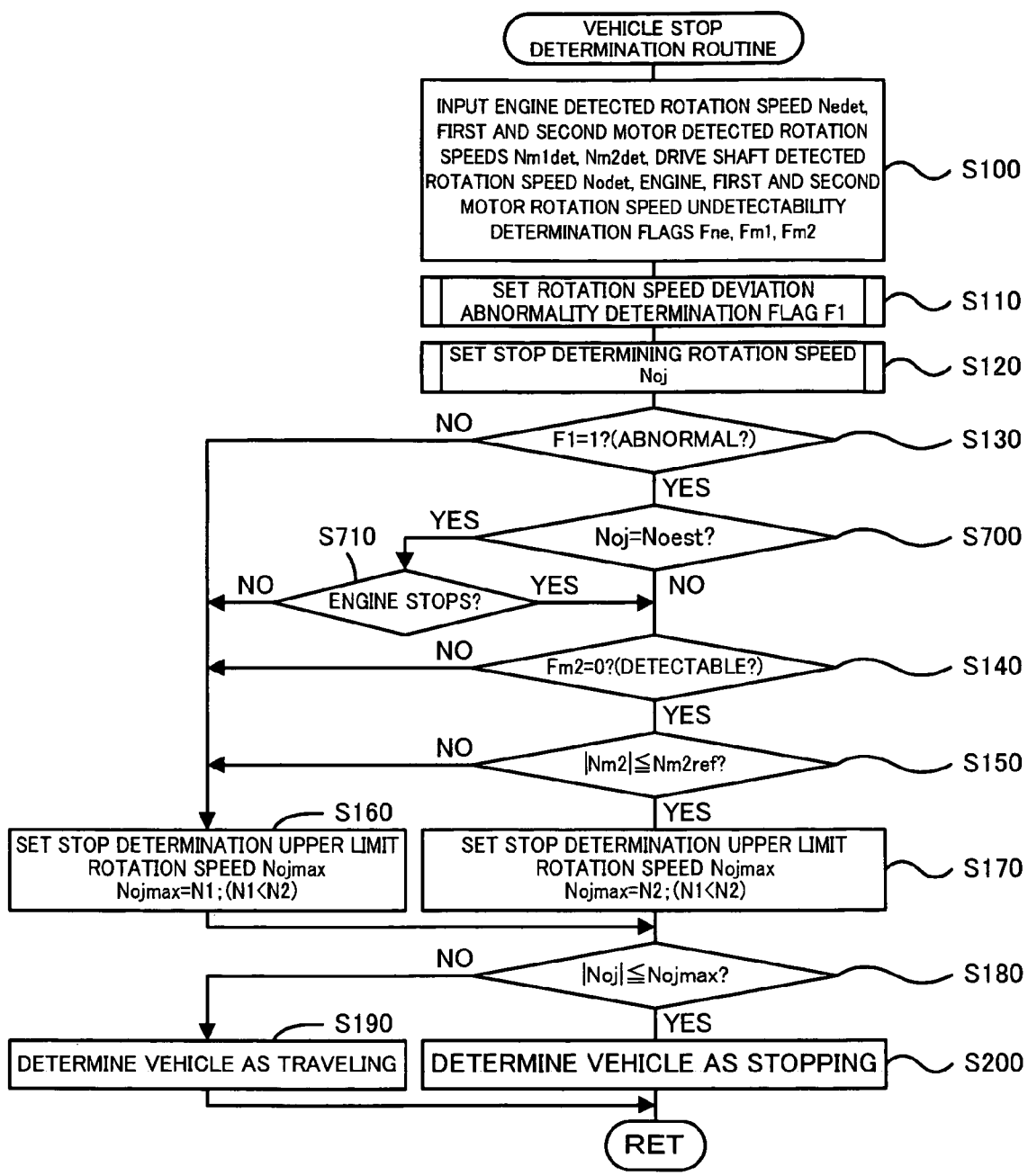
FIG. 9 is a flowchart showing one example of a vehicle stop determination routine of a modified embodiment.

In the hybrid vehicle 20 of the embodiment, when the rotation speed deviation abnormality determination flag F1 is value 1, the predetermined rotation speed N1 is set as the stop determination upper limit rotation speed Nojmax when the second motor rotation speed undetectability determination flag Fm2 is value 0 and the absolute value of the detected rotation speed Nm2det of the motor MG2 is the threshold value Nm2ref or less, and when the second motor rotation speed undetectability determination flag Fm2 is value 1, and when the second motor rotation speed undetectability determination flag Fm2 is value 0 and the absolute value of the detected rotation speed Nm2det of the motor MG2 is larger than the threshold value Nm2ref, the predetermined rotation speed N2 is set as the stop determination upper limit rotation speed Nojmax. However, when the estimated rotation speed Noest of the ring gear shaft 32a is set as the stop determining rotation speed Noj, and the engine 22 is operated, the predetermined rotation speed N1 may be set as the stop determination upper limit rotation speed Nojmax. One example of the vehicle stop determination routine in this case is shown in FIG. 9. The routine of FIG. 9 is the same as the vehicle stop determination routine of FIG. 3 except for the configuration in which the processing of steps S700 and S710 is added. Accordingly, the configuration differing from the routine of FIG. 3 will be mainly described. Of the routine of FIG. 9, the same processing as the routine of FIG. 3 is assigned with the same reference numerals and characters. In the routine of FIG. 9, when the rotation speed deviation abnormality determination flag F is value 1 in step S130, it is determined whether or not the stop determining rotation speed Noj set in step S120 is equal to the estimated rotation speed Noest, namely, whether or not the estimated rotation speed Noest is set as the stop determining rotation speed Noj (step S700), and when the stop determining rotation speed Noj is equal to the estimated rotation speed Noest, it is determined whether or not the engine 22 is stopping (step S710). When it is determined that the engine 22 is not stopping, namely, the engine 22 is operated, the predetermined rotation speed N1 is set as the stop determination upper limit rotation speed Nojmax (step S160). When it is determined that the engine 22 is stopping, the processing of steps S140 and S150 is executed, and the predetermined rotation speed N1 or the predetermined rotation speed N2 is set as the stop determination upper limit rotation speed Nojmax (steps S160 and S170). Here, when the estimated rotation speed Noest is set as the stop determining rotation speed Noj, and the engine 22 is operated, the predetermined rotation speed N1 may be set as the stop determination upper limit rotation speed Nojmax. This is because the crank position sensor 23 is configured as the electromagnetic pickup sensor, and therefore, the detected rotation speed Nedet of the engine 22 is considered to be usually substantially equal to the actual rotation speed of the engine 22 without being subjected to the influence of the magnetic field from the road heater so much when the engine 22 is operated, namely, when the engine 22 is rotated at some degree of rotation speed.

In the hybrid vehicle 20 of the embodiment, when the rotation speed deviation abnormality determination flag F is value 1, the predetermined rotation speed N1 is set as the stop determination upper limit rotation speed Nojmax when the second motor rotation speed undetectability determination flag Fm2 is value 0 and the absolute value of the detected rotation speed Nm2det of the motor MG2 is the threshold value Nm2ref or less, and when the second motor rotation speed undetectability determination flag Fm2 is value 1, and when the second motor rotation speed undetectability determination flag Fm2 is value 0 and the absolute value of the detected rotation speed Nm2det of the motor MG2 is larger than the threshold value Nm2ref, the predetermined rotation speed N2 is set as the stop determination upper limit rotation speed Nojmax, but the predetermined rotation speed N2 may be set as the stop determination upper limit rotation speed Nojmax irrespective of the second motor rotation speed undetectability determination flag Fm2 and the detected rotation speed Nm2det of the motor MG2.

In the hybrid vehicle 20 of the embodiment, the value calculated by the engine ECU 24 on the basis of the signal from the crank position sensor 23 is used as the detected rotation speed Nedet of the engine 22, but the value which is detected by the engine ECU 24 on the basis of the signal from a sensor such as a cam angle sensor not illustrated which detects a cam angle by being mounted to a camshaft not illustrated of the engine 22 may be used as the detected rotation speed Nedet of the engine 22. Here, when the cam angle sensor is the one that transmits a signal to the hybrid electronic control unit 70, the value calculated on the basis of the signal from the cam angle sensor by the hybrid electronic control unit 70 is used as the detected rotation speed Nedet of the engine 22.

In the hybrid vehicle 20 of the embodiment, the transmission 60 capable of changing speed with two speed stages of Hi and Lo, but the speed stages of the transmission 60 are not limited to two stages, but three or more speed stages may be adopted.

Figure 10:
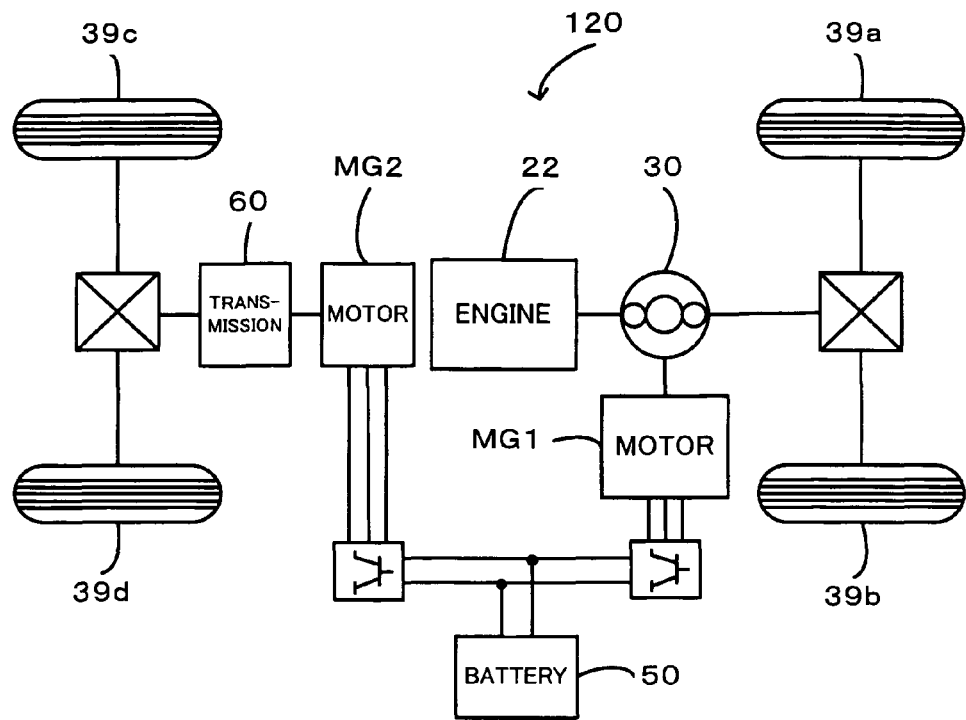
FIG. 10 is a configuration diagram showing the outline of the configuration of a hybrid vehicle 120 of a modified embodiment.

In the hybrid vehicle 20 of the embodiment, the power of the motor MG2 is changed in speed by the transmission 60 and is output to the ring gear shaft 32*a*, but as shown as an example in a hybrid vehicle 120 of the modified embodiment of FIG. 10, the power of the motor MG2 is changed in speed by the transmission 60 and may be connected to an axle (axle connected to the drive wheels 39*c* and 39*d* in FIG. 10) differing from the axle (axle to which the drive wheels 39*a* and 39*b* are connected) to which the ring gear shaft 32*a* is connected.

Figure 11:
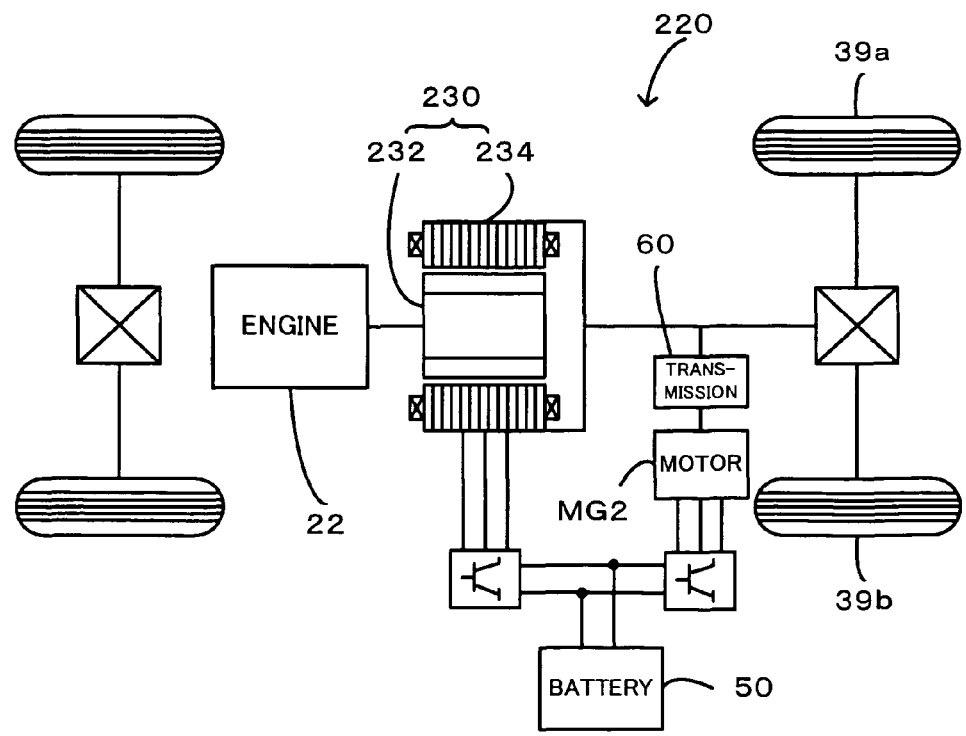
FIG. 11 is a configuration diagram showing the outline of the configuration of a hybrid vehicle 220 of a modified embodiment.

In the hybrid vehicle 20 of the embodiment, the power of the engine 22 is output to the ring gear shaft 32*a* as the drive shaft connected to the drive wheels 39*a* and 39*b* via the power distribution and integration mechanism 30, but as shown as an example in the hybrid vehicle 220 of the modified embodiment of FIG. 11, a pair-rotor motor 230 which has an inner rotor 232 connected to the crankshaft 26 of the engine 22 and an outer rotor 234 connected to the drive shaft which outputs the power to the drive wheels 39*a* and 39*b*, and transmits part of the power of the engine 22 to the drive shaft and converts the remaining power into electric power may be included.

In the hybrid vehicle 20 of the embodiment, the power from the motor MG2 is changed in speed by the transmission 60 and is output to the ring gear shaft 32*a*, but the power from the motor MG2 may be reduced in speed by the reduction gear and may be output to the ring gear shaft 32*a*, or the power from the motor MG2 may be directly output to the ring gear shaft 32*a* without being changed in rotation speed.

In the embodiment, the hybrid vehicle 20 which travels by the power from the engine and the power from the motor is described, but the present invention may be applied to a vehicle which travels by only the power from the motor.

Here, the correspondence of the main elements of the embodiment and the modified embodiment, and the main elements of the invention described in the section of "Disclosure of the Invention" will be described. In the embodiment, the engine 22 corresponds to "internal combustion engine", the power distribution and integration mechanism 30 which is connected to the crankshaft 26 as the output shaft of the engine 22 and is connected to the ring gear shaft 32*a* as the drive shaft connected to the drive wheels 39*a* and 39*b* and the motor MG1 connected to the power distribution and integration mechanism 30 correspond to "rotation regulation module", the motor MG2 corresponds to "motor", the transmission 60 connected to the motor MG2 and the ring gear shaft 32*a* as the drive shaft corresponds to "power transmission module", the rotation speed sensor 36 and the hybrid electronic control unit 70 which detect the rotation speed of the ring gear shaft 32*a* as the detected rotation speed Nodet, the crank position sensor 23 and the engine ECU 24 which detect the rotation speed of the engine 22 as the detected rotation speed Nedet, the rotational position detection sensor 43 and the motor ECU 40 which detect the rotation speed of the motor MG1 as the detected rotation speed Nm1det, and the hybrid electronic control unit 70 which calculates the rotation speed of the ring gear shaft 32*a* as the estimated rotation speed Noest on the basis of the detected rotation speed Nedet and the detected rotation speed Nm1det correspond to "drive shaft rotation speed detection and estimation module", and the rotational position detection sensor 44 and the motor ECU 40 which detect the rotation speed of the motor MG2 as the detected rotation speed Nm2det correspond to "motor rotation speed detection module", the hybrid electronic control unit 70 which executes the rotation speed deviation abnormality determination processing of S110 of determining whether or not the detected rotation speed Nodet of the ring gear shaft 32*a* and the detected rotation speed Nm2det of the motor MG2 are both normal values on the basis of the detected rotation speed Nodet of the ring gear shaft 32*a* and the detected rotation speed Nm2det of the motor MG2 corresponds to "rotation speed determination module". The hybrid electronic control unit 70, which executes the processing of S130, S160 and S170 of setting the predetermined rotation speed N1 as the stop determination upper limit rotation speed Nojmax when the detected rotation speed Nodet of the ring gear shaft 32*a* and the detected rotation speed Nm2det of the motor MG2 are both determined as normal, and setting the predetermined rotation speed N2 which is larger than the predetermined rotation speed N1 as the stop determination upper limit rotation speed Nojmax when it is determined that at least one of the detected rotation speed Nodet of the ring gear shaft 32*a* and the detected rotation speed Nm2det of the motor MG2 is not a normal value, corresponds to "stop determination range setting module". The hybrid electronic control unit 70 which executes the processing of S120, and S180 to S200 of setting any one of the detected rotation speed Nodet and the estimated rotation speed Noest of the ring gear shaft 32*a* and value 0 as the stop determining rotation speed Noj, and determining whether or not the vehicle is stopping on the basis of the result of comparing the stop determining rotation speed Noj which is set and the stop determination upper limit rotation speed Nojmax corresponds to "vehicle stop determination module". Further, the parking lock mechanism 90 which locks and releases the drive wheels 39*a* and 39*b* corresponds to "lock module", and the battery 50 capable of charging and discharging electric power corresponds to "accumulator". The system main relay 56 which cuts off supply of the electric power from the battery 50 to the inverters 41 and 42 which drive the motors MG1 and MG2 corresponds to "cutoff and connection module". The hybrid electronic control unit 70 which executes the processing of S500 to S520 of locking the drive wheels 39*a* and 39*b* by the parking lock mechanism 90 in response to the shift change when the vehicle is determined as stopping, and the shift position SP is changed to the P position by the driver corresponds to "parking control module". The hybrid electronic control unit 70 which executes the processing of S600 to S620 of cutting off the system main relay 56 when the ignition is turned off while the vehicle is determined as stopping corresponds to "cutoff control module". In the modified embodiment, the hybrid electronic control unit 70 which sets the detected rotation speed Nm2 of the motor MG2 as the stop determining rotation speed Noj instead of the detected rotation speed Nodet of the ring gear shaft 32*a* when the rotation speed deviation abnormality determination flag F is value 0 corresponds to the aforementioned "vehicle stop determination module". The correspondence of the main elements of the embodiment and the modified embodiment and the main elements of the invention described in the section of "Disclosure of the Invention" does not limit the elements of the invention described in the section of "Disclosure of the Invention", because the embodiment is one example for concretely describing the best mode for carrying out the invention described in the "Disclosure of the Invention". More specifically, interpretation of the invention described in the section of "Disclosure of the Invention" should be performed on the basis of the description of the section, and the embodiment is only one example of the invention described in the section of "Disclosure of the Invention".

In the embodiment, the present invention is described as the mode of the hybrid vehicle 20, but it may be described as the form of the vehicle other than the automobile, or may be described as the mode of the control method of a vehicle such as the hybrid vehicle 20.

Hereinbefore, the embodiments of the present invention have been described with reference to drawings, but the present invention is not limited to the above embodiments. It will be apparent that various modifications can be made to the present invention without departing from the spirit and scope of the present invention.

INDUSTRIAL APPLICABILITY

The present invention can be used in a manufacturing industry of a vehicle and the like.

The invention claimed is:

1. A vehicle, comprising:
a motor capable of inputting and outputting power;
a power transmission module transmitting power between said motor and a drive shaft connected to a drive wheel;
a drive shaft rotation speed detection or estimation module detecting or estimating a rotation speed of said drive shaft;
a motor rotation speed detection module detecting a rotation speed of said motor;
a rotation speed determination module determining whether or not a detected or estimated drive shaft rotation speed and a detected motor rotation speed are both normal on the basis of said detected or estimated drive shaft rotation speed which is the rotation speed of the drive shaft detected or estimated by said drive shaft rotation speed detection or estimation module, and said detected motor rotation speed which is the rotation speed of the motor detected by said motor rotation speed detection module;
a stop determination range setting module setting a first predetermined rotation speed range as a stop determination range when said detected or estimated drive shaft rotation speed and said detected motor rotation speed are both determined as normal by said rotation speed determination module, and setting a second predetermined rotation speed range with said first predetermined rotation speed range as one part thereof as said stop determination range when it is determined that at least one of said detected or estimated drive shaft rotation speed and said detected motor rotation speed is not normal by said rotation speed determination module; and
a vehicle stop determination module determining whether or not the vehicle is stopping on the basis of a determining rotation speed of said drive shaft which is set on the basis of said detected or estimated drive shaft rotation speed detected or estimated by said drive shaft rotation speed detection or estimation module, or the detected motor rotation speed detected by said motor rotation speed detection module, and a stop determination range set by said stop determination range setting module.

2. A vehicle according to claim 1,
wherein said stop determination range setting module is a module which sets a range of the first predetermined rotation speed or less as said first predetermined rotation speed range, and sets a range of the second predetermined rotation speed or less, which is larger than said first predetermined rotation speed as said second predetermined rotation speed range; and
said vehicle stop determination module is a module which determines whether or not said vehicle is stopping on the basis of an absolute value of the determining rotation speed of said drive shaft and said stop determination range.

3. A vehicle according to claim 1,
wherein said drive shaft rotation speed detection or estimation module is a module detecting or estimating a rotation speed based on the rotation speed of said drive shaft and a predetermined factor when the predetermined factor occurs;
said motor rotation speed detection module is a module capable of detecting the rotation speed of said motor irrespective of the predetermined factor even when said predetermined factor occurs; and
said stop determination range setting module is a module setting a range including said detected or estimated drive shaft rotation speed when said predetermined factor occurs as said second predetermined rotation speed range.

4. A vehicle according to claim 1,
wherein said stop determination range setting module is a module which sets said second predetermined rotation speed range as said stop determination range when said detected motor rotation speed is within a third predetermined rotation speed range, and sets said first predetermined rotation speed range as said stop determination range when said detected motor rotation speed is outside said third predetermined rotation speed range, when it is determined that at least one of said detected or estimated drive shaft rotation speed and said detected motor rotation speed is not normal by said rotation speed determination module; and
said vehicle stop determination module is a module which determines whether or not said vehicle is stopping with said detected or estimated drive shaft rotation speed as the determining rotation speed of said drive shaft.

5. A vehicle according to claim 4,
wherein said stop determination range setting module sets a range of the rotation speed of said motor corresponding to said first predetermined rotation speed range in the rotation speed of said drive shaft as said third predetermined rotation speed range.

6. A vehicle according to claim 1,
wherein said rotation speed determination module is a module which estimates the rotation speed of said motor on the basis of said detected or estimated drive shaft rotation speed and a state of said power transmission module, and determines whether or not said detected or estimated drive shaft rotation speed and said detected motor rotation speed are both normal on the basis of a deviation between an estimated motor rotation speed which is the estimated rotation speed of the motor and said detected motor rotation speed.

7. A vehicle according to claim 6,
wherein said rotation speed determination module is a module which determines that at least one of said detected or estimated drive shaft rotation speed and said detected motor rotation speed is not normal when the deviation between said estimated motor rotation speed and said detected motor rotation speed is outside a fourth predetermined rotation speed range for a predetermined time.

8. A vehicle according to claim 1,
wherein said vehicle stop determination module is a module which determines whether or not said vehicle is stopping with value 0 set as the determining rotation speed of said drive shaft when said detected or estimated drive shaft rotation speed is within a fifth predetermined rotation speed range, and determines whether or not said vehicle is stopping with said detected or estimated drive shaft rotation speed set as the determining rotation speed of said drive shaft when said detected or estimated drive shaft rotation speed is outside said fifth predetermined rotation speed range, when it is determined at least one of said detected or estimated drive shaft rotation speed and said detected motor rotation speed is not normal by said rotation speed determination module.

9. A vehicle according to claim 8,
wherein said vehicle stop determination module is a module which sets a range including said detected or estimated drive shaft rotation speed when said vehicle is stopping as said fifth predetermined rotation speed range.

10. A vehicle according to claim 1, said vehicle further comprising:
an internal combustion engine; and
a rotation regulation module which is connected to an output shaft of the internal combustion engine and said drive shaft independently rotatable with respect to the output shaft, and is capable of regulating a rotation speed of said output shaft with respect to said drive shaft with input and output of electric power and input and output of power to and from said output shaft and said drive shaft.

11. A vehicle according to claim 10,
wherein said rotation regulation module is a module comprising a three shaft-type power input output module which is connected to three shafts that are the output shaft of said internal combustion engine, said drive shaft and a third shaft, and inputs and outputs power to and from a remaining shaft on the basis of power which is input and output to and from any two shafts of the three shafts, and a generator capable of inputting and outputting power to and from said third shaft.

12. A vehicle according to claim 11,
wherein said drive shaft rotation speed detection or estimation module is a module comprising a drive shaft rotation speed detection module which detects a rotation speed of said drive shaft, an engine rotation speed detection module which detects a rotation speed of said internal combustion engine, a generator rotation speed detection module which detects a rotation speed of said generator, and a drive shaft rotation speed estimation module which estimates the rotation speed of said drive shaft on the basis of a detected engine rotation speed which is the rotation speed of the internal combustion engine detected by said engine rotation speed detection module and a detected generator rotation speed which is the rotation speed of the generator detected by said generator rotation speed detection module; and
said vehicle stop determination module is a module which sets the detected drive shaft rotation speed which is the rotation speed of the drive shaft detected by said drive shaft rotation speed detection module, or the estimated drive shaft rotation speed which is the rotation speed of the drive shaft estimated by said drive shaft rotation speed estimation module as said detected or estimated drive shaft rotation speed, and determines whether or not said vehicle is stopping on the basis of the determining rotation speed of said drive shaft which is set on the basis of the detected or estimated drive shaft rotation speed or said detected motor rotation speed and said stop determination range, when it is determined that at least one of said detected or estimated drive shaft rotation speed and said detected motor rotation speed is not normal by said rotation speed determination module.

13. A vehicle according to claim 12,
wherein said vehicle stop determination module is a module which determines whether or not said vehicle is stopping with value 0 set as the determining rotation speed of said drive shaft when said detected or estimated drive shaft rotation speed is within the fifth predetermined rotation speed range, and determines whether or not said vehicle is stopping with said detected or estimated drive shaft rotation speed set as the determining rotation speed of said drive shaft when said detected or estimated drive shaft rotation speed is outside said fifth predetermined rotation speed range, when it is determined that at least one of said detected or estimated drive shaft rotation speed and said detected motor rotation speed is not normal by said rotation speed determination module, and when the rotation speed of said internal combustion engine cannot be detected by said engine rotation speed detection module, or when the rotation speed of said generator cannot be detected by said generator rotation speed detection module.

14. A vehicle according to claim 13,
wherein said vehicle stop determination module is a module which sets a range including said detected or estimated drive shaft rotation speed when said vehicle is stopping as said fifth predetermined rotation speed range.

15. A vehicle according to claim 1, said vehicle further comprising:
a lock module which locks said drive wheel; and
a parking control module which controls said lock module so that said drive wheel is locked by said lock module when parking conditions including a condition that said vehicle is determined as stopping by said vehicle stop determination module, and a condition that a shift position is operated to shift to a parking position by a driver are established.

16. A vehicle according to claim 1, said vehicle further comprising:
an accumulator capable of charging and discharging electricity;
a cutoff and connection module which connects said accumulator to an electric drive system including at least said motor to be capable of cut off said accumulator; and
a cutoff control module which controls the cutoff and connection module so that said motor and said accumulator are cut off by said cutoff and connection module when cutoff conditions including a condition that said vehicle is determined as stopping by said vehicle stop determination module, and a condition that ignition is turned off by a driver are established.

17. A vehicle according to claim 1,
wherein said power transmission module is a transmission module which transmits power between the rotating shaft of said motor and said drive shaft with change in a transmission ratio.

18. A control method of a vehicle comprising a motor capable of inputting and outputting power, a power transmission module transmitting power between said motor and a drive shaft connected to a drive wheel, a drive shaft rotation speed detection or estimation module detecting or estimating a rotation speed of said drive shaft, and a motor rotation speed detection module detecting a rotation speed of said motor,
   wherein it is determined whether or not a detected or estimated drive shaft rotation speed and a detected motor rotation speed are both normal on the basis of said detected or estimated drive shaft rotation speed which is the rotation speed of the drive shaft detected or estimated by said drive shaft rotation speed detection or estimation module, and said detected motor rotation speed which is the rotation speed of the motor detected by said motor rotation speed detection module; and
   when it is determined that said detected or estimated drive shaft rotation speed and said detected motor rotation speed are both normal, it is determined whether or not said vehicle is stopping on the basis of a determining rotation speed of said drive shaft which is set on the basis of said detected or estimated drive shaft rotation speed or said detected motor rotation speed, and a first predetermined rotation speed range, and when it is determined that at least one of said detected or estimated drive shaft rotation speed and said detected motor rotation speed is not normal, it is determined whether or not the vehicle is stopping on the basis of the determining rotation speed of said drive shaft which is set on the basis of said detected or estimated drive shaft rotation speed or said detected motor rotation speed and a second predetermined rotation speed range with said first predetermined rotation speed range as a part thereof.

* * * * *